(12) United States Patent
    Guo et al.

(10) Patent No.: US 11,182,029 B2
(45) Date of Patent: Nov. 23, 2021

(54) SMART INTERACTIVE TABLET AND DRIVING METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Rui Guo, Beijing (CN); Jianting Wang, Beijing (CN); Zhanchang Bu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 53 days.

(21) Appl. No.: 16/839,295

(22) Filed: Apr. 3, 2020

(65) Prior Publication Data
    US 2021/0109613 A1    Apr. 15, 2021

(30) Foreign Application Priority Data

Oct. 15, 2019  (CN) .......................... 201910979417.X

(51) Int. Cl.
    *G06F 3/044*   (2006.01)
    *G06F 3/0354*  (2013.01)
    *G09G 3/20*    (2006.01)

(52) U.S. Cl.
    CPC .......... *G06F 3/044* (2013.01); *G06F 3/03545* (2013.01); *G09G 3/20* (2013.01); *G06F 2203/04105* (2013.01)

(58) Field of Classification Search
    None
    See application file for complete search history.

(56) References Cited

U.S. PATENT DOCUMENTS

| 9,020,266 | B2 * | 4/2015 | Wang ....................... G06K 9/22 |
|   |   |   | 382/185 |
| 2013/0181908 | A1 * | 7/2013 | Santiago ............... G06F 3/0416 |
|   |   |   | 345/173 |
| 2013/0271487 | A1 * | 10/2013 | Lincoln ................. G06F 3/0488 |
|   |   |   | 345/619 |
| 2015/0355778 | A1 * | 12/2015 | Kim ....................... G06F 3/0416 |
|   |   |   | 345/173 |
| 2019/0310738 | A1 * | 10/2019 | Dyvik ................. G06F 3/04883 |

* cited by examiner

*Primary Examiner* — Krishna P Neupane
(74) *Attorney, Agent, or Firm* — Leason Ellis LLP

(57) ABSTRACT

Disclosed are a smart interactive tablet and a driving method thereof. The smart interactive tablet includes a touch panel, a display panel, a first driving circuit and a second driving circuit. The touch panel is provided with a sampling circuit configured to acquire coordinates of points of a writing trajectory on the touch panel, send pre-display coordinates corresponding to a certain point of the writing trajectory to be displayed and different from an end point of the writing trajectory to the first driving circuit, and send real-time coordinates corresponding to the end point of the writing trajectory to the second driving circuit; the first driving circuit is configured to report the pre-display coordinates to the second driving circuit; and the second driving circuit is configured to predict a scribing trajectory between the pre-display coordinates and the real-time coordinates and drive the display panel to display the scribing trajectory.

20 Claims, 8 Drawing Sheets

SMART INTERACTIVE TABLET AND DRIVING METHOD THEREOF

CROSS-REFERENCE TO RELATED APPLICATION

The present application claims priority of the Chinese Patent Application No. 201910979417.X, filed on Oct. 15, 2019 and entitled "Electronic White Board and Driving Method Thereof". For all purposes under the U.S. law, the disclosure of the aforementioned application is incorporated by reference as part of the disclosure of the present application.

TECHNICAL FIELD

Embodiments of the present disclosure relate to a smart interactive tablet and a driving method thereof.

BACKGROUND

With the rise of smart schools and smart communities, large-sized interactive white boards (IWB) are becoming more and more widely used. Unlike the dynamic picture applications of conventional consumer products, IWB is mainly used for conferences and education, etc., and has the functions of writing, displaying and collaborating.

SUMMARY

At least one embodiment of the present disclosure provides a smart interactive tablet, which includes a touch panel, a display panel, a first driving circuit and a second driving circuit. The touch panel is provided with a sampling circuit, the sampling circuit is configured to acquire coordinates of points of a writing trajectory on the touch panel, to send pre-display coordinates to the first driving circuit, and to send real-time coordinates to the second driving circuit, the pre-display coordinates are coordinates corresponding to a certain point of the points of the writing trajectory which is to be displayed by the display panel and different from an end point of the points of the writing trajectory, the real-time coordinates are coordinates corresponding to the end point of the points of the writing trajectory when the sampling circuit sends the pre-display coordinates, the first driving circuit is configured to report the pre-display coordinates to the second driving circuit; and the second driving circuit is configured to predict a scribing trajectory between the pre-display coordinates and the real-time coordinates and to drive the display panel to display the scribing trajectory.

For example, in the smart interactive tablet provided by some embodiments of the present disclosure, the second driving circuit is configured to control the display panel to successively display the pre-display coordinates and the scribing trajectory; a starting point of the scribing trajectory includes the pre-display coordinates, and an end point of the scribing trajectory includes next-stage display coordinates or includes coordinates which are located between the pre-display coordinates and the next-stage display coordinates, and the next-stage display coordinates are coordinates transmitted by the first driving circuit to the second driving circuit in a writing order after the pre-display coordinates are transmitted by the first driving circuit to the second driving circuit.

For example, in the smart interactive tablet provided by some embodiments of the present disclosure, the sampling circuit is configured to send the real-time coordinates to the second driving circuit while sending the pre-display coordinates to the first driving circuit; the sampling circuit is further configured to spend a first time period to transmit the real-time coordinates to the second driving circuit, and spend a second time period to transmit the pre-display coordinates to the second driving circuit via the first driving circuit; and the second driving circuit is configured to control the display panel to display the scribing trajectory after a preset time period after receiving the real-time coordinates, the preset time period is a time interval between adjacent two frames of the display panel, and the first time period and the second time period are both twice the preset time period.

For example, in the smart interactive tablet provided by some embodiments of the present disclosure, a starting point of the scribing trajectory includes the pre-display coordinates, and an end point of the scribing trajectory includes the real-time coordinates or includes coordinates which are located between the pre-display coordinates and the real-time coordinates.

For example, in the smart interactive tablet provided by some embodiments of the present disclosure, the second driving circuit is configured to control the display panel to simultaneously display the pre-display coordinates and the scribing trajectory.

For example, in the smart interactive tablet provided by some embodiments of the present disclosure, the sampling circuit is further configured to acquire pressure sensing information corresponding to positions on the writing trajectory, to send the real-time coordinates and real-time pressure sensing information corresponding to the real-time coordinates to the second driving circuit, and to send the pre-display coordinates and pre-display pressure sensing information corresponding to the pre-display coordinates to the first driving circuit; the first driving circuit is configured to send the pre-display coordinates and the pre-display pressure sensing to the second driving circuit; and the second driving circuit is configured to predict edge position information of the scribing trajectory based on the pre-display coordinates, the pre-display pressure sensing information, the real-time coordinates and the real-time pressure sensing information.

For example, in the smart interactive tablet provided by some embodiments of the present disclosure, the sampling circuit includes a sampling sub-circuit, a gesture recognition sub-circuit, and a coordinate conversion sub-circuit, the sampling sub-circuit is configured to acquire the writing trajectory according to a change in capacitance; the gesture recognition sub-circuit is configured to determine a touch gesture according to the writing trajectory, and to send the touch gesture to the first driving circuit; the coordinate conversion sub-circuit is configured to calculate the coordinates of the points of the writing trajectory, to send the pre-display coordinates to the first driving circuit, and to send the real-time coordinates to the second driving circuit; and the first driving circuit is configured to send the pre-display coordinates to the second driving circuit in response to that the touch gesture is a writing gesture.

For example, in the smart interactive tablet provided by some embodiments of the present disclosure, the second driving circuit includes a signal conversion circuit, a prediction circuit, a gamma correction circuit, and an electric level conversion circuit; and the signal conversion circuit, the prediction circuit, the gamma correction circuit and the electric level conversion circuit are configured to successively process the pre-display coordinates and the real-time coordinates, and the electric level conversion circuit is configured to generate a driving signal for driving the display panel to display the scribing trajectory.

For example, in the smart interactive tablet provided by some embodiments of the present disclosure, the prediction circuit includes a judgment sub-circuit and a prediction sub-circuit, the judgment sub-circuit is configured to judge whether a center of a shape formed by the real-time coordinates is located within a scribing path, the scribing path includes a first boundary and a second boundary, and the first boundary and the second boundary are respectively located at two ends of the shape formed by the real-time coordinates and are both perpendicular to the shape formed by the real-time coordinates; and the prediction sub-circuit is configured to predict the scribing trajectory in response to that the center of the shape formed by the real-time coordinates is located within the scribing path.

For example, the smart interactive tablet provided by some embodiments of the present disclosure further includes a writing stylus, wherein the writing stylus is provided with a detector, and the detector is configured to detect the pressure sensing information of the positions on the writing trajectory and to send the pressure sensing information to the sampling circuit.

For example, in the smart interactive tablet provided by some embodiments of the present disclosure, the touch panel includes a capacitive touch panel.

At least one embodiment of the present disclosure further provides a driving method, which is applicable for the smart interactive tablet provided by any one embodiment of the present disclosure and includes: acquiring coordinates of points of the writing trajectory, sending the pre-display coordinates to the first driving circuit, and sending the real-time coordinates to the second driving circuit, wherein the pre-display coordinates are coordinates corresponding to the certain point of the points of the writing trajectory which is to be displayed by the display panel and different from the end point of the points of the writing trajectory, and the real-time coordinates are coordinates corresponding to the end point of the points of the writing trajectory when the pre-display coordinates are sent; causing the first driving circuit to report the pre-display coordinates to the second driving circuit; causing the second driving circuit to predict a scribing trajectory between the pre-display coordinates and the real-time coordinates; and driving the display panel to display the scribing trajectory.

For example, in the driving method provided by some embodiments of the present disclosure, the driving the display panel to display the scribing trajectory includes: causing the display panel to successively display the pre-display coordinates and the scribing trajectory, wherein a starting point of the scribing trajectory incudes the pre-display coordinates, and an end point of the scribing trajectory includes next-stage display coordinates or includes coordinates which are located between the pre-display coordinates and the next-stage display coordinates, and the next-stage display coordinates are coordinates transmitted by the first driving circuit to the second driving circuit in a writing order after the pre-display coordinates are transmitted by the first driving circuit to the second driving circuit.

For example, in the driving method provided by some embodiments of the present disclosure, the acquiring the coordinates of the points of the writing trajectory, sending the pre-display coordinates to the first driving circuit, and sending the real-time coordinates to the second driving circuit, includes: acquiring the coordinates of the points of the writing trajectory; and sending the pre-display coordinates to the first driving circuit, and sending the real-time coordinates to the second driving circuit, wherein a time period for transmitting the real-time coordinates is a first time period, and a time period for transmitting the pre-display coordinates is a second time period; and the causing the display panel to successively display the pre-display coordinates and the scribing trajectory includes: controlling the display panel to display the pre-display coordinates, and to display the scribing trajectory after a preset time period, wherein the preset time period is a time interval between adjacent two frames of the display panel, and the first time period and the second time period are both twice the preset time period.

For example, in the driving method provided by some embodiments of the present disclosure, a starting point of the scribing trajectory includes the pre-display coordinates, and an end point of the scribing trajectory includes the real-time coordinates or includes coordinates which are located between the pre-display coordinates and the real-time coordinates.

For example, in the driving method provided by some embodiments of the present disclosure, the driving the display panel to display the scribing trajectory includes: causing the display panel to display the pre-display coordinates and the scribing trajectory.

For example, in the driving method provided by some embodiments of the present disclosure, the acquiring the coordinates of the points of the writing trajectory, sending the pre-display coordinates to the first driving circuit, and sending the real-time coordinates to the second driving circuit, includes: acquiring the coordinates of the points of the writing trajectory and pressure sensing information corresponding to positions on the writing trajectory, sending the real-time coordinates and real-time pressure sensing information corresponding to the real-time coordinates to the second driving circuit, and simultaneously sending the pre-display coordinates and pre-display pressure sensing information corresponding to the pre-display coordinates to the first driving circuit; the causing the first driving circuit to report the pre-display coordinates to the second driving circuit includes: causing the pre-display coordinates and the pre-display pressure sensing information to be sent to the second driving circuit via the first driving circuit; and the causing the second driving circuit to predict the scribing trajectory between the pre-display coordinates and the real-time coordinates includes: predicting edge position information of the scribing trajectory based on the pre-display coordinates, the pre-display pressure sensing information, the real-time coordinates, and the real-time pressure sensing information, and determining the scribing trajectory.

For example, in the driving method provided by some embodiments of the present disclosure, the acquiring the coordinates of the points of the writing trajectory, sending the pre-display coordinates to the first driving circuit, and sending the real-time coordinates to the second driving circuit, further includes: recognizing a touch gesture according to the writing trajectory, and sending the touch gesture to the first driving circuit; and the causing the first driving circuit to report the pre-display coordinates to the second driving circuit includes: causing the first driving circuit to send the pre-display coordinates to the second driving circuit in a case where the touch gesture is a writing gesture.

For example, in the driving method provided by some embodiments of the present disclosure, the causing the second driving circuit to predict the scribing trajectory between the pre-display coordinates and the real-time coordinates includes: performing a signal conversion, a prediction of the scribing trajectory, a gamma correction, and an electric level conversion successively on the pre-display coordinates and the real-time coordinates to obtain a driving signal for driving the display panel to display the scribing trajectory.

For example, in the driving method provided by some embodiments of the present disclosure, the scribing trajectory is predicted in a case where a center of a shape formed by the real-time coordinates is located within a scribing path; otherwise, the scribing trajectory is not predicted; and the scribing path includes a first boundary and a second boundary, and the first boundary and the second boundary are respectively located at two ends of the shape formed by the real-time coordinates and are both perpendicular to the shape formed by the real-time coordinates.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
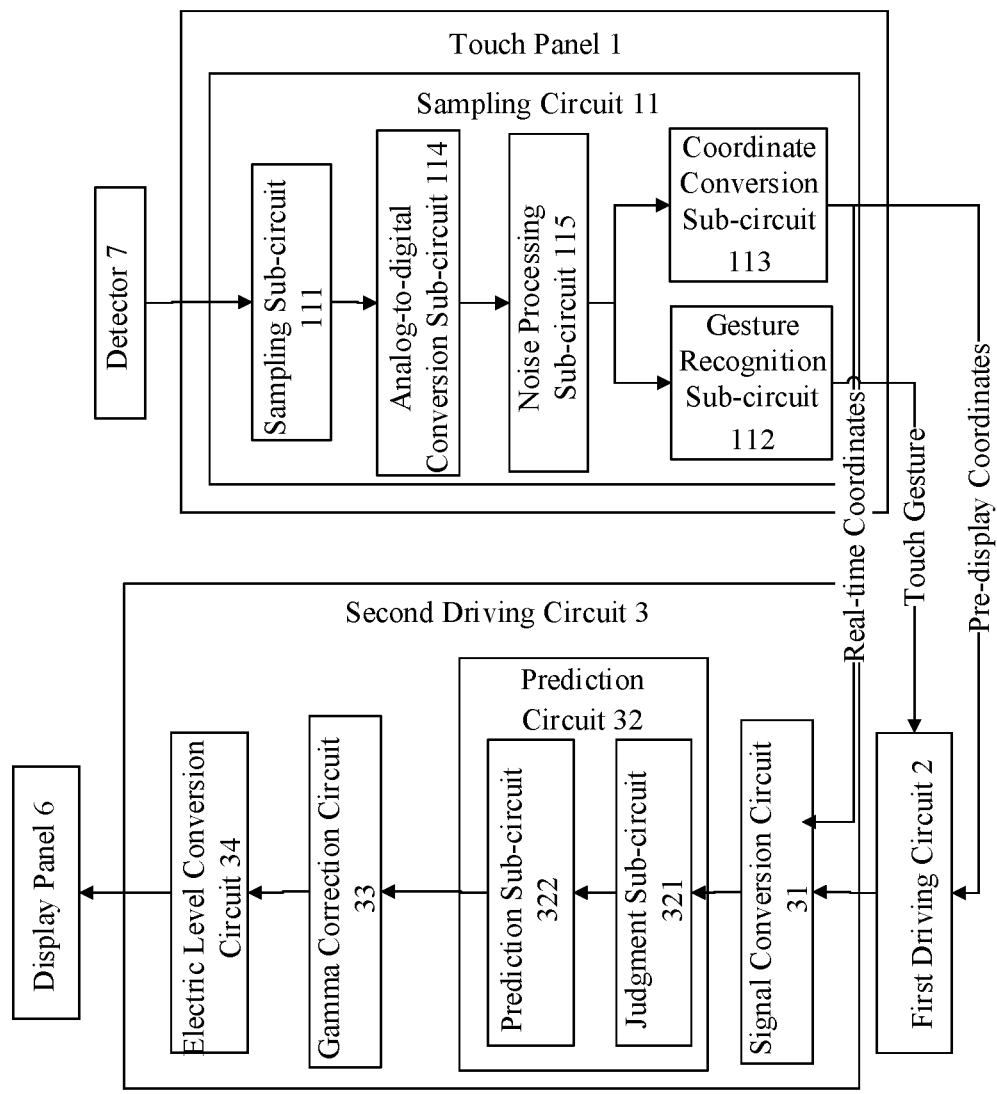
FIG. 1 is a schematic structural diagram of a smart interactive tablet provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Hereinafter, the embodiments according to the present disclosure are described in detail with reference to the accompanying drawings. It should be noted that, in the accompanying drawings, the same reference numerals are given to components substantially having the same or similar structure and function, and repeated descriptions thereof will be omitted.

Due to the limitation of the capacitive touch display principle, the current capacitive touch-typed smart interactive tablet is unable to achieve real-time display, that is, there is a large spacing between a real-time display position of the smart interactive tablet and a real-time position of a stylus tip, which causes a serious delay in display and poor display effect. Therefore, how to improve the display effect of the smart interactive tablet is a technical problem that those skilled in the art need to solve urgently.

At least one embodiment of the present disclosure provides a smart interactive tablet, which includes a touch panel, a display panel, a first driving circuit and a second driving circuit. The touch panel is provided with a sampling circuit, the sampling circuit is configured to acquire coordinates of points of a writing trajectory on the touch panel, to send pre-display coordinates to the first driving circuit, and to send real-time coordinates to the second driving circuit, the pre-display coordinates are coordinates corresponding to a certain point of the points of the writing trajectory which is to be displayed by the display panel and different from an end point of the writing trajectory, and the real-time coordinates are coordinates corresponding to the end point of the writing trajectory when the sampling circuit sends the pre-display coordinates; the first driving circuit is configured to report the pre-display coordinates to the second driving circuit; and the second driving circuit is configured to predict a scribing trajectory between the pre-display coordinates and the real-time coordinates and to drive the display panel to display the scribing trajectory.

At least one embodiment of the present disclosure further provides a driving method corresponding to the above-mentioned smart interactive tablet.

The smart interactive tablet provided by the embodiments of the present disclosure sends the real-time coordinates of the writing trajectory on the touch panel to the second driving circuit by the sampling circuit in the touch panel, and predicts the scribing trajectory between the pre-display coordinates and the real-time coordinates by the second driving circuit and drives the display panel to display the scribing trajectory by the second driving circuit, so that the writing trajectory displayed on the display panel can present a real-time trajectory, thereby avoiding the phenomenon of serious delay during the display of the smart interactive tablet and improving the display effect of the smart interactive tablet.

Some embodiments and examples of the present disclosure are described in detail below with reference to the accompanying drawings.

Figure 2:
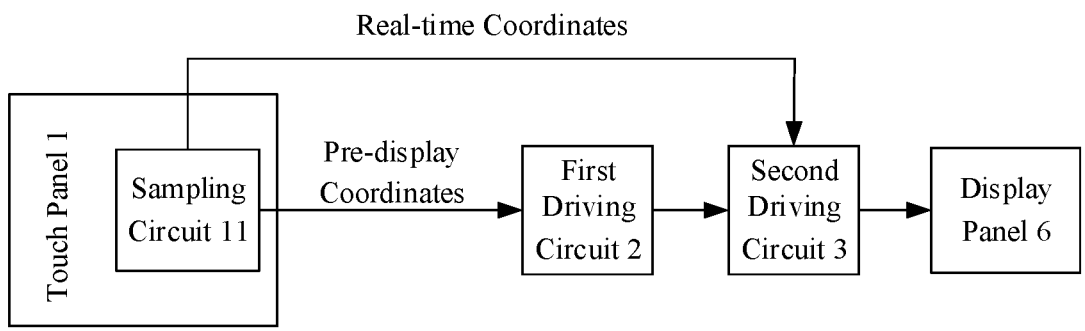
FIG. 2 is another schematic structural diagram of a smart interactive tablet provided by at least one embodiment of the present disclosure.

As illustrated in FIG. 1 and FIG. 2, the embodiment of the present disclosure provides a smart interactive tablet, and the smart interactive tablet includes: a display panel 6 and a touch panel 1 which is an external type to combine with the display panel 6 or is attached to the display panel 6; or an embedded touch display screen. For example, the embedded touch panel can realize the touch function of the touch panel 1 and the display function of the display panel 6. In this case, the embedded touch panel can serve as both the touch screen 1 and the display panel 6. That is, the specific structures and implementation manners of the touch panel and the display panel are not limited in the embodiment of the present disclosure.

The following description will take the display panel 6 and the touch panel 1 which is an external type to combine with the display panel 6 or is attached to the display panel 6 as an example, but this case should not be regarded as a limitation to the present disclosure.

As illustrated in FIG. 1 and FIG. 2, the smart interactive tablet further includes a first driving circuit 2 and a second driving circuit 3. The touch panel 1 is provided with a sampling circuit 11, the sampling circuit 11 is configured to acquire coordinates of points of a writing trajectory on the touch panel 1, to send pre-display coordinates to the first driving circuit 2, and to send real-time coordinates to the second driving circuit 3, the pre-display coordinates are coordinates corresponding to a certain point of the points of the writing trajectory which is to be displayed by the display panel 6 and different from an end point of the points of the writing trajectory, and the real-time coordinates are coordinates corresponding to the end point of the points of the writing trajectory when the sampling circuit 11 sends the pre-display coordinates. The first driving circuit 2 is configured to report the pre-display coordinates to the second driving circuit 3. And the second driving circuit 3 is configured to predict a scribing trajectory between the pre-display coordinates and the real-time coordinates and to drive the display panel 6 to display the scribing trajectory.

For example, in some embodiments, the touch panel 1 is an external touch panel, which is arranged on the light exiting side of the display panel 6. The sampling circuit 11 is connected to the touch panel 1 to acquire the capacitance change of the touch panel 1, and the first driving circuit 2 and the second driving circuit are arranged on the display panel 6. When a user writes on the touch panel 1, the sampling circuit 11 can acquire the writing trajectory. As the user writes on the touch panel 1, the sampling circuit 11 can calculate the coordinates corresponding to the writing trajectory in real time, and the sampling circuit 11 can report the coordinates corresponding to the writing trajectory to the second driving circuit 3 in a writing order. The coordinates which is to be displayed in the writing trajectory is the pre-display coordinates.

In research, the inventors of the present application have found that in the case where the pre-display coordinates are reported to the second driving circuit 3 via the first driving circuit 2 and then the pre-display coordinates are displayed on the display panel 6, because the computing capability of the first driving circuit 2 is limited, the stylus tip has moved to another position when the sampling circuit 11 sends the pre-display coordinates to the first driving circuit 2. At this moment, the position of the stylus tip is the end point of the writing trajectory, and is also a real-time position at the same time, and the corresponding coordinates of the real-time position are the real-time coordinates. The pre-display coordinates is reported to the second driving circuit 3 after passing through the first driving circuit 2. The second driving circuit 3 displays the pre-display coordinates in the current frame, however, because the stylus tip has moved to the another position at this moment, the end point of the writing trajectory displayed on the touch panel 1 is the pre-display coordinates, thereby causing that the display effect of the smart interactive tablet is poor and the delay phenomenon occurs.

Compared with the smart interactive tablet in the above hypothetical case, in the smart interactive tablet provided by the embodiment of the present disclosure, the sampling circuit 11 also directly sends the real-time coordinates to the second driving circuit 3 when the sampling circuit 11 sends the pre-display coordinates to the first driving circuit 2, the second driving circuit 3 can predict the scribing trajectory between the pre-display coordinates and the real-time coordinates, and then the scribing trajectory can be displayed on the display panel 6, so that the end point of the writing trajectory displayed on the display panel 6 is a corresponding position of the real-time coordinates, thereby improving the display effect of the smart interactive tablet. For example, in some embodiments, a starting point of the scribing trajectory includes the pre-display coordinates, thus avoiding a breakpoint between the scribing trajectory and the previous writing trajectory; and an end point of the scribing trajectory can includes the real-time coordinates or include coordinates which are located between the real-time coordinates and the pre-display coordinates, without being specifically limited herein. For example, the stylus tip can be referred to a stylus pen or a finger, that is, a finger can be used to write on the touch panel 1 instead of the stylus pen.

For example, the second driving circuit 3 is on a TCON board (also referred to as a logic board, a screen driving board, or a central control board) of the display panel 6. For example, the TCON board can be a commonly used TCON board, and the TCON board will not be described in detail here. For example, the pre-display coordinates and the real-time coordinates are not coordinates of a single pixel and are both coordinates of a straight line formed by coordinates of a plurality of pixels. For example, the real-time coordinates can be transmitted to the second driving circuit in the form of a USB signal or other signals, and the pre-display coordinates can be sent by the first driving circuit 2 to the second driving circuit 3 in the VX1 data format.

For example, in some embodiments, the second driving circuit 3 is configured to control the display panel 6 to successively display the pre-display coordinates and the scribing trajectory. The starting point of the scribing trajectory includes the pre-display coordinates, and the end point of the scribing trajectory includes next-stage display coordinates or includes coordinates which are located between the pre-display coordinates and the next-stage display coordinates. The next-stage display coordinates are coordinates transmitted by the first driving circuit 2 to the second driving circuit 3 in a writing order after the pre-display coordinates are transmitted by the first driving circuit 2 to the second driving circuit 3.

Figure 3:
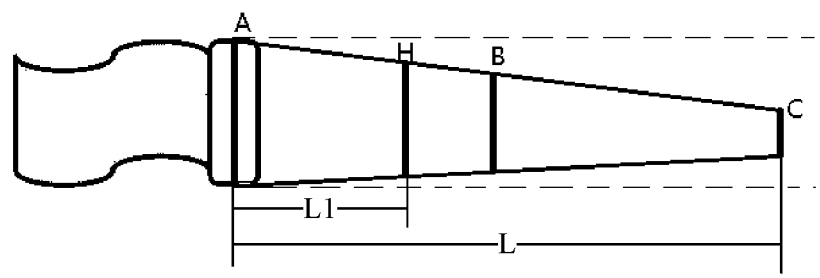
FIG. 3 is a schematic diagram of writing on a smart interactive tablet provided by at least one embodiment of the present disclosure.

For example, the second driving circuit 3 can determine the starting point and the end point of the scribing trajectory. As illustrated in FIG. 3, the writing trajectory passes through position A, position B, and position C in sequence, position A includes the pre-display coordinates, and position A is the starting point of the scribing trajectory. After the first driving circuit 2 transmits the coordinates of position A to the second driving circuit 3, the coordinates of position B will be transmitted to the second driving circuit 3 according to the writing order, that is, the coordinates of position B is the next-stage display coordinates. And position C includes the coordinates of the real-time position of the stylus tip corresponding to position A. The second driving circuit 3 can control the end point of the scribing trajectory, so that the end point of the scribing trajectory includes coordinates between the pre-display coordinates of position A and the next-stage display coordinates of position B. Assuming that the end point of the scribing trajectory is position H between position A having the pre-display coordinates and position B having the next-stage display coordinates, the display panel 6 successively displays the pre-display coordinates of position A, the coordinates of the end point H, and the next-stage display coordinates B. When the sampling circuit 11 transmits the next-stage display coordinates of position B to the first driving circuit 2, the next-stage display coordinates of position B become pre-display coordinates at this moment, and the stylus tip has moved to position D. In the smart interactive tablet of the foregoing hypothetical case, after the pre-display coordinates are displayed, the next-stage display coordinates need to be displayed after being processed by the first driving circuit 2. In contrast, the smart interactive tablet provided by the present embodiment can display the end point H somewhere between the pre-display coordinates and the real-time coordinates of the stylus tip, which can reduce the distance between the real-time display position and the real-time position of the stylus tip, thereby achieving the beneficial effect of improving the display effect of the smart interactive tablet.

Figure 4:
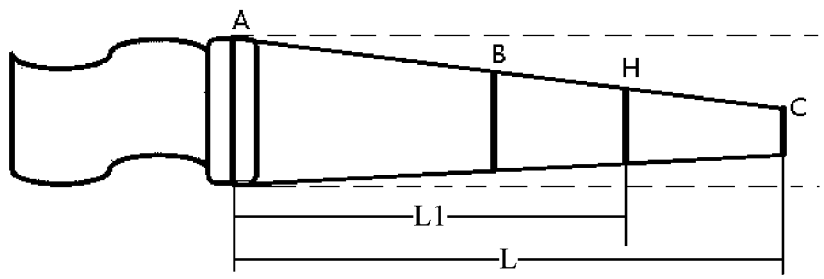
FIG. 4 is another schematic diagram of writing on a smart interactive tablet provided by at least one embodiment of the present disclosure.

In addition, in the present embodiment, the end point of the scribing trajectory includes coordinates between the pre-display coordinates and the next-stage display coordinates, and the phenomenon of jumping back of the writing trajectory is not likely to occur. Here, jumping back refers to that: taking four positions of A, H, B and C as an example, the end point of the writing trajectory displayed by the display panel 6 at a first time point is the coordinates of position A, the end point of the writing trajectory displayed at a second time point is the coordinates of position H, and the end point of the writing trajectory displayed at a third time point is the coordinate of position B, and in this case, the scribing trajectory displays these three groups of coordinates in sequence; if the end point H is set between position B and position C, the end point of the writing trajectory displayed by the display panel 6 at the first time point is position A, the end point of the writing trajectory displayed at the second time point is position H which is behind position B, the end point of the writing trajectory displayed at the third time point is position B, and in this case, human eyes may see that the end point of the writing trajectory jumps back. In the present embodiment, the coordinates of the end point of the scribing trajectory is set between the pre-display coordinates of position A and the next-stage display coordinates of position B, which can avoid the phenomenon that the writing trajectory jumps back. For example, in some examples, when determining the end point of the scribing trajectory, assuming that the distance between the pre-display coordinates and the real-time coordinates is L, and the length of the scribing trajectory is L1, the ratio of L1 to L is a preset ratio, and the preset ratio can be specifically 1:4, 1:5, 4:5, etc. In the case where the preset ratio is relatively small, it can be ensured with a great probability that the end point H of the scribing trajectory is before the next-stage display coordinates B. In addition, because the time interval between adjacent two frames of the smart interactive tablet is very short, the human eyes may not be able to capture the change in the scribing trajectory between the adjacent two frames. Therefore, as illustrated in FIG. 4, the end point H of the scribing trajectory can also be set behind position B; and in this case, the proportion of L1 is large, for example, L1/L can be set to be greater than ½, so that the end point H is located behind position B.

Figure 5:
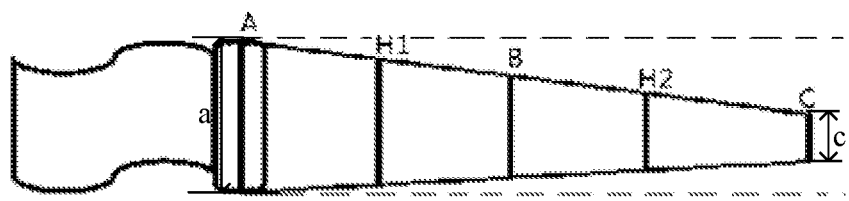
FIG. 5 is further another schematic diagram of writing on a smart interactive tablet provided by at least one embodiment of the present disclosure.

For example, in some embodiments, the sampling circuit 11 is configured to send the real-time coordinates to the second driving circuit 3 while sending the pre-display coordinates to the first driving circuit 2; the sampling circuit 11 is further configured to spend a first time period to transmit the real-time coordinates to the second driving circuit 3, and spend a second time period to transmit the pre-display coordinates to the second driving circuit 3 via the first driving circuit 2; and the second driving circuit 3 is configured to control the display panel 6 to display the scribing trajectory after a preset time period after receiving the real-time coordinates, the preset time period is the time interval between adjacent two frames of the display panel 6, and the first time period and the second time period are both twice the preset time period. For example, the sampling circuit 11 can be caused to report the real-time coordinates and the pre-display coordinates at the same time, the time period for the sampling circuit 11 to transmit the real-time coordinates is the first time period, the time period required for the sampling circuit 11 to report the pre-display coordinates to the second driving circuit 3 via the first driving circuit 2 is the second time period, and the first time period and the second time period are both twice the preset time period, so that the second driving circuit 3 can be caused to obtain the pre-display coordinates and the real-time coordinates simultaneously. As illustrated in FIG. 5, the second driving circuit 3 control the display panel 6 to display the pre-display coordinates A immediately after receiving the pre-display coordinates A, and the frame being displayed at this moment is defined as a first frame, that is, the pre-display coordinates A are displayed in the first frame; and the second driving circuit 3 control the display panel 6 to display the scribing trajectory after that the second driving circuit 3 receives the real-time coordinate and delays for the preset time period, the frame being displayed at this moment is defined as a second frame, and the end point of the writing trajectory displayed by the display panel 6 in the second frame is H1; during a third frame, the second driving circuit 3 receives the next-stage display coordinates B, then the next-stage display coordinates B can be displayed in the third frame; and the next-stage real-time coordinates H2 corresponding to the next-stage display coordinates can be displayed in a fourth frame. In this case, H1 is located between A and B, and H2 is located between B and the next-stage real-time coordinates corresponding to B. In addition, the display panel 6 can be caused to display the pre-display coordinates in odd-numbered frames and to display the scribing trajectory in even-numbered frames.

Figure 6:
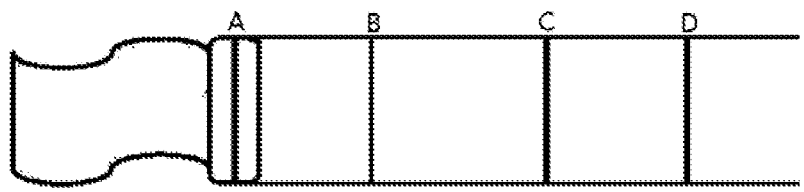
FIG. 6 is still another schematic diagram of writing on a smart interactive tablet provided by at least one embodiment of the present disclosure.

For example, in some other embodiments, the scribing trajectory and the pre-display coordinates can be displayed at the same time. In this case, the end point of the scribing trajectory can include the real-time coordinates or coordinates of any point between the real-time coordinates and the pre-display coordinates. In the present embodiment, the phenomenon of jumping back during displaying the writing trajectory does not occur. For example, as illustrated in FIG. 6, assuming that the end point of the writing trajectory displayed by the display panel 6 in the first frame is C, because the first driving circuit 2 can transmit coordinate information once every two frames, no new signal is transmitted to the second driving circuit 3 in the second frame; in the second frame, the display panel 6 copies the display information of the first frame, and the end point of the writing trajectory displayed in the second frame is C; during the third frame, a new signal is transmitted to the second driving circuit 3, and the next-stage display coordinates B and the next-stage real-time coordinates D corresponding to the next-stage display coordinates B are transmitted to the second driving circuit 3, therefore, the end point of the writing trajectory displayed in the third frame is D; in the fourth frame, no new signal is transmitted and the end point of the scribing trajectory displayed in the fourth frame is still D. Therefore, the case of that the display panel 6 displays the writing trajectory can be deduced by analogy and will not be repeated here.

Figure 9:
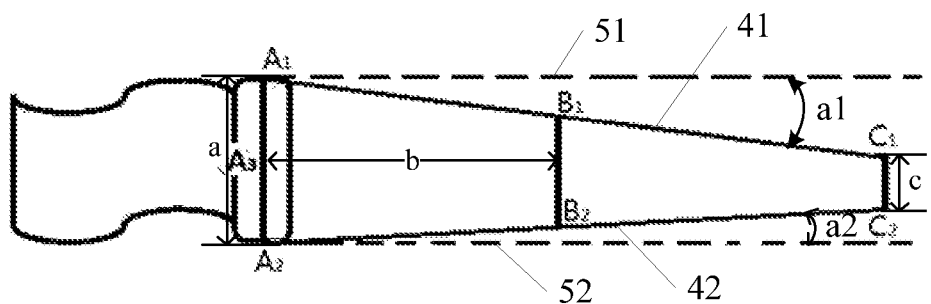
FIG. 9 is a schematic diagram of writing corresponding to method 1 of a smart interactive tablet provided by at least one embodiment of the present disclosure.

For example, in some embodiments, the sampling circuit 11 is further configured to acquire pressure sensing information corresponding to positions on the writing trajectory, to send the real-time coordinates and real-time pressure sensing information corresponding to the real-time coordinates to the second driving circuit 3, and to send the pre-display coordinates and pre-display pressure sensing information corresponding to the pre-display coordinates to the first driving circuit 2. The first driving circuit 2 is configured to send the pre-display coordinates and the pre-display pressure sensing information to the second driving circuit 3. The second driving circuit 3 is configured to predict edge position information of the scribing trajectory based on the pre-display coordinates, the pre-display pressure sensing information, the real-time coordinates and the real-time pressure sensing information. For example, the pressure sensing information corresponding to the positions on the writing trajectory changes when the user writes on the touch panel 1, and the sampling circuit 11 can acquire the pressure sensing information. The pressure is related to the width of positions on the writing trajectory being displayed. In the case where the pressure is relatively large, the width of the writing trajectory is large, and in the case where the pressure is relatively small, the width of the writing trajectory is small. FIG. 6 illustrates the writing effect of the touch panel 1 which cannot acquire the pressure sensing information, and FIG. 3 to FIG. 5 illustrate the display effect of the touch panel 1 which can acquire the pressure sensing information. In the present embodiment, the pressure sensing information can be acquired. For example, as illustrated in FIG. 5, position A has a display width of the pre-display coordinates in the case where the pressure sensing information can be acquired, and position C has a display width of the real-time coordinates in the case where the pressure sensing information can be acquired. The width of position A is a, a represents the width of the writing trajectory at position A, the width of position C is c, and c represents the width of the writing trajectory at position C. For example, as illustrated in FIG. 9, two endpoints of position A are A1 and A2, and two endpoints of position C are C1 and C2. In the case where the scribing trajectory between A and C is predicted, A1C1 is a first boundary line 41 of the scribing trajectory and A2C2 is a second boundary line 42 of the scribing trajectory.

For example, as illustrated in FIG. 1, the sampling circuit 11 includes a sampling sub-circuit 111, a gesture recognition sub-circuit 112, and a coordinate conversion sub-circuit 113. The sampling sub-circuit 111 is configured to acquire the writing trajectory according to a change in capacitance. The gesture recognition sub-circuit 112 is configured to determine a touch gesture according to the writing trajectory, and to send the touch gesture to the first driving circuit 2. The coordinate conversion sub-circuit 113 is configured to calculate the coordinates of the points of the writing trajectory, to send the pre-display coordinates to the first driving circuit 2, and simultaneously to send the real-time coordinates to the second driving circuit 3. The first driving circuit 2 is configured to send the pre-display coordinates to the second driving circuit 3 in response to that the touch gesture is a writing gesture.

For example, the touch panel 1 is a capacitive touch panel, and for example, the touch panel 1 can be a self-capacitance type or a mutual capacitance type. For example, the self-capacitance type touch panel includes a plurality of touch electrodes arranged in an array, and each touch electrode is used to sense a touch position. The mutual capacitance type touch panel includes a plurality of first touch electrodes along direction X and a plurality of second touch electrodes along direction Y, and the X direction and the Y direction are, for example, perpendicular to each other. For example, the first touch electrode is a touch driving electrode and the second touch electrode is a touch sensing electrode. The plurality of first touch electrodes and the plurality of second touch electrodes are intersected with each other to form touch capacitors at intersection positions, and the touch capacitors are used to sense the touch position. Regardless of whether the self-capacitance type touch panel or the mutual capacitance type touch panel is adopted, the touch electrodes can be electrically connected to the sampling circuit through leads. The capacitance at a touch point changes when a finger or a stylus pen touches the touch panel 1. After the sampling sub-circuit 111 detects the writing trajectory according to the change in capacitance, the stylus tip has moved to the real-time coordinates, that is, point C in FIG. 3, and the gesture recognition sub-circuit 112 can determine the corresponding touch gesture according to the writing trajectory with the point C as the end point. In the case where the user performs writing, the gesture recognition sub-circuit 112 can determine that it is a writing gesture, and in this case, the first driving circuit 2 sends the pre-display coordinates to the second driving circuit 3. Different touch gestures can cause the first driving circuit 2 to call different feedbacks. For example, in the case where the gesture recognition sub-circuit 112 detects that the palm touches the touch panel 1, the first driving circuit 2 may call an eraser in the software program, the pre-display coordinates are not sent to the second driving circuit 3, and the pre-display coordinates are not displayed. The coordinate conversion sub-circuit 113 can calculate the coordinates of the points of the writing trajectory. The pre-display coordinates and the real-time coordinates both corresponding to points on the writing trajectory. The determination of the touch gesture and the coordinate conversion can be performed simultaneously or successively, without being specifically limited here. In addition, the sampling circuit 11 can further include an analog-to-digital conversion sub-circuit 114 and a noise processing sub-circuit 115. After the sampling sub-circuit 111 acquires a capacitance signal on the touch panel 1, the capacitance signal is processed by the analog-to-digital conversion sub-circuit 114 and the noise processing sub-circuit 115 in sequence, and then sent to the coordinate conversion sub-circuit 113 and the gesture recognition sub-circuit 112.

For example, the touch panel 1 and the display panel 6 are overlapped with each other. The touch panel 1 can detect whether an object (such as a finger or a stylus pen) touches its surface and report the touch position of the object to, for example, the first driving circuit 2, and the first driving circuit 2 recognizes the touch position and then transmits display data corresponding to a touch operation related to the touch position to the display panel for display. For example, an effective touch region of the touch panel 1 covers an effective display region of the display panel 6.

For example, the first driving circuit 2 can be implemented as an integrated circuit driving chip, but is not limited thereto; and for example, the second drive circuit 3 can also be implemented as an integrated circuit driving chip, but is not limited thereto. For example, the first driving circuit 2 and the second driving circuit 3 can be implemented as different integrated circuit driving chips or the same integrated circuit driving chip. For example, the first driving circuit 2 and the second driving circuit 3 can be implemented on a system board, but are not limited thereto. For example, the system board can include hardware structures such as a CPU, a GPU, a signal transceiver circuit, an input/output interface, a memory, etc., and can further include software programs such as a Windows operating system, an Android operating system, a smart interactive tablet application software, a conference software, etc. For example, the first driving circuit 2 can control the second driving circuit 3, in response to the touch operation (such as the touch gesture) detected by the touch panel 1, to cause the display panel 6 to perform a corresponding display.

For example, as illustrated in FIG. 1, the second driving circuit 3 includes a signal conversion circuit 31, a prediction circuit 32, a gamma correction circuit 33, and an electric level conversion circuit 34. The signal conversion circuit 31, the prediction circuit 32, the gamma correction circuit 33 and the electric level conversion circuit 34 are configured to successively process the pre-display coordinates and the real-time coordinates, and the electric level conversion circuit 34 is configured to generate a driving signal for driving the display panel 6 to display the scribing trajectory. For example, the real-time coordinates sent by the sampling circuit 11 is converted by the signal conversion circuit 31 to form a signal that matches the second driving circuit 3, and at the same time, the pre-display coordinates sent by the first driving circuit 2 can also be converted first. After the signal conversion is completed, the prediction circuit 32 can perform prediction of the scribing trajectory based on the pre-display coordinates and the real-time coordinates. After the prediction is completed, the display picture of the display panel 6 can be determined. The gamma correction circuit 33 can perform a gamma correction, and then form the driving signal that drives the display panel 6 to display a picture.

For example, as illustrated in FIG. 1, the prediction circuit 32 includes a judgment sub-circuit 321 and a prediction sub-circuit 322, the judgment sub-circuit 321 is configured to judge whether a center of a shape (e.g., a line or a position) formed by the real-time coordinates is located within a scribing path, the scribing path includes a first boundary 51 and a second boundary 52, and the first boundary 51 and the second boundary 52 are respectively located at two ends of the shape formed by the real-time coordinates and are both perpendicular to the shape formed by the real-time coordinates. The prediction sub-circuit 322 is configured to predict the scribing trajectory in response to that the center of the shape formed by the real-time coordinates is located within the scribing path. There are two implementations to predict the scribing path.

Figure 7:
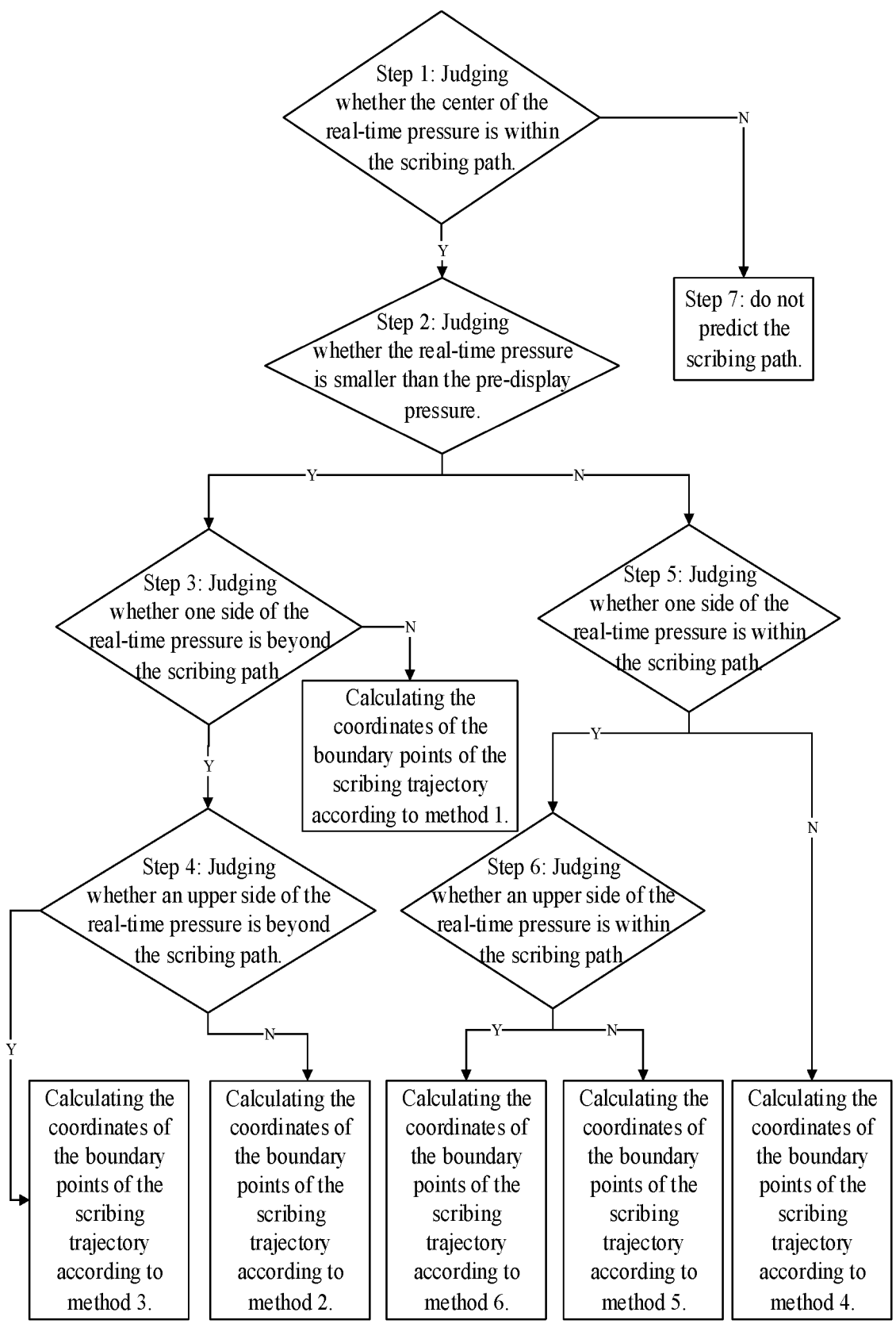
FIG. 7 is a schematic flowchart of a writing operation on a smart interactive tablet provided by at least one embodiment of the present disclosure.

In a first implementation, the sampling circuit 11 can acquire the pressure sensing information while acquiring the writing trajectory. In this case, the widths of various positions on the writing trajectory displayed on the display panel 6 can be variable. For example, as illustrated in FIG. 5, the pre-display coordinates corresponding to position A, the pressure corresponding to the pre-display coordinates is a, the real-time coordinates corresponding to position C, and the pressure corresponding to the real-time coordinates is c. The following specifically describes how to calculate the boundary coordinates of the scribing trajectory with reference to FIG. 7.

Step 1: judging whether the center of the real-time pressure is within the scribing path, if yes (Y), executing step 2, otherwise (N), executing step 7;

Step 2: judging whether the real-time pressure is smaller than the pre-display pressure, if yes, executing step 3, otherwise, executing step 5;

Step 3: judging whether one side of the real-time pressure is beyond the scribing path, if yes, executing step 4, otherwise, calculating the coordinates of the boundary points of the scribing trajectory according to method 1;

Step 4: judging whether an upper side of the real-time pressure is beyond the scribing path, if yes, calculating the coordinates of the boundary points of the scribing trajectory according to method 3, otherwise, calculating the coordinates of the boundary points of the scribing trajectory according to method 2;

Step 5: judging whether one side of the real-time pressure is within the scribing path, if yes, executing step 6, otherwise, calculating the coordinates of the boundary points of the scribing trajectory according to method 4;

Step 6: judging whether an upper side of the real-time pressure sensing is within the scribing path, if yes, calculating the coordinates of the boundary points of the scribing trajectory according to method 6, otherwise, calculating the positions of the boundary points of the scribing trajectory according to method 5; and Step 7: not predicting the scribing path.

Each computing method will be described in detail below.

Assumes that the pre-display coordinates corresponding to position A, the coordinates of the center point of position A is (x1, y1), the coordinates of the endpoint, coincident with the first boundary 51, of position A is A1, the coordinates of the endpoint, coincident with the second boundary 52, of position A is A2, and the pressure at position A is a, the real-time coordinates corresponding to position C, the coordinates of the center point C3 of position C is (x3, y3), the coordinates of the endpoint, close to the first boundary 51, of position C is C1, the coordinates of the endpoint, close to the second boundary 52, of position C is C2, position B is any position between position A and position C, and the distance between position A and position B is b. The scribing trajectory includes a first boundary line 41 and a second boundary line 42, the first boundary line 41 is a connection line between A1 and C1, and the second boundary line 42 is a connection line between A2 and C2.

Figure 8:
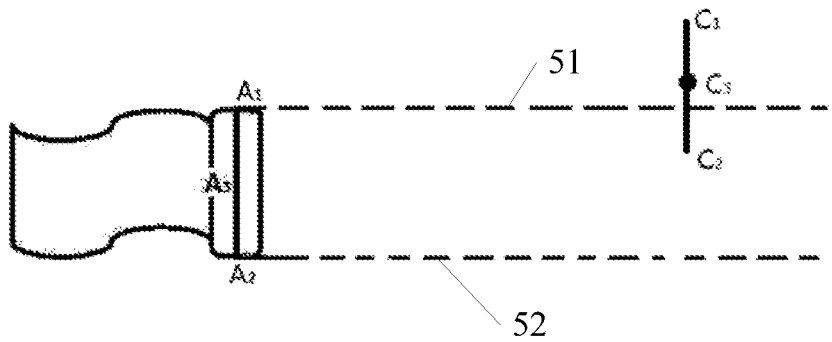
FIG. 8 is still another schematic diagram of writing on a smart interactive tablet provided by at least one embodiment of the present disclosure.

As illustrated in FIG. 8, C3 is the center point of the connection line between C1 and C2. In this case, C3 is not within the scribing path, the center of the real-time pressure is not within the scribing path, y3 is greater than y1+a/2, or y3 is smaller than y1−a/2.

Method 1: as illustrated in FIG. 9, the real-time pressure is smaller than the pre-display pressure, and the real-time pressure is all within the scribing path. The angle between the first boundary line 41 and the first boundary 51 is a1, the angle between the second boundary line 42 and the second boundary 52 is a2, and a1 and a2 can both be obtained based on position A and position C, which are not described in detail here. The point, located on the first boundary line 41, of position B is B1, and the point, located on the second boundary line 42, of position B is B2. The coordinates of B1 is (x1+b, y1+a/2−b tan(a1)), and the coordinates of B2 is (x1+b, y1−a/2+b tan(a2)). The coordinates between B1 and B2 are all coordinates on the scribing trajectory.

Figure 10:
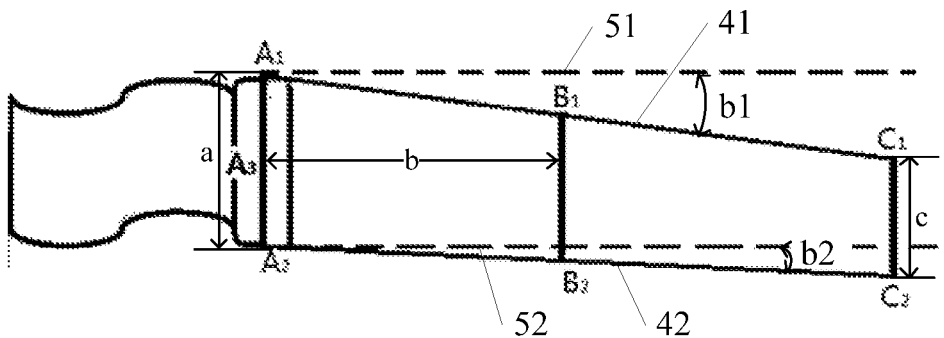
FIG. 10 is a schematic diagram of writing corresponding to method 2 of a smart interactive tablet provided by at least one embodiment of the present disclosure.

Method 2: as illustrated in FIG. 10, the real-time pressure is smaller than the pre-display pressure, and a lower side of the real-time pressure is beyond the scribing path, that is, C2 is at an outer side of the scribing path. The angle between the first boundary line 41 and the first boundary 51 is b1, and the angle between the second boundary line 42 and the second boundary 52 is b2. The coordinates of B1 is (x1+b, y1+a/2−b tan(b1)), and the coordinates of B2 is (x1+b, y1−a/2−b tan(b2)).

Figure 11:
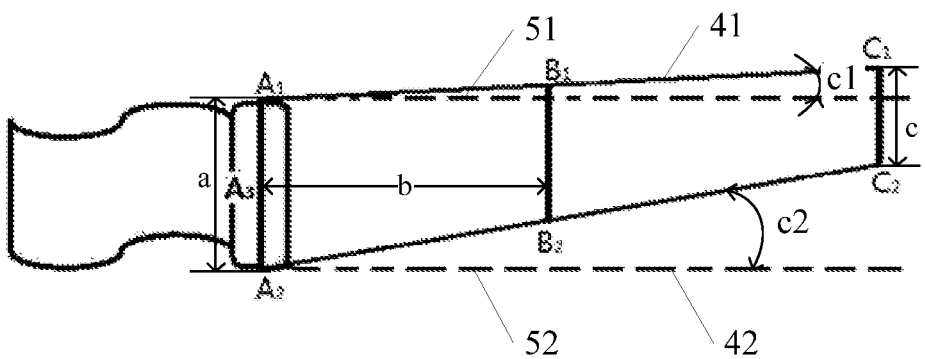
FIG. 11 is a schematic diagram of writing corresponding to method 3 of a smart interactive tablet provided by at least one embodiment of the present disclosure.

Method 3: as illustrated in FIG. 11, the real-time pressure is smaller than the pre-display pressure, and an upper side of the real-time pressure is beyond the scribing path, that is, C1 is at an outer side of the scribing path. The angle between the first boundary line 41 and the first boundary 51 is c1, and the angle between the second boundary line 42 and the second boundary 52 is c2. The coordinates of B1 is (x1+b, y1+a/2+b tan(c1)), and the coordinates of B2 is (x1+b, y1−a/2+b tan(c2)).

Figure 12:
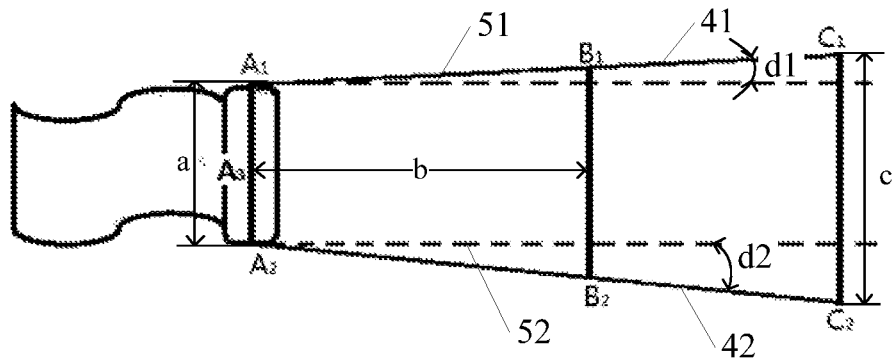
FIG. 12 is a schematic diagram of writing corresponding to method 4 of a smart interactive tablet provided by at least one embodiment of the present disclosure.

Method 4: as illustrated in FIG. 12, the real-time pressure is greater than the pre-display pressure, and both ends of the shape formed by the real-time pressure are not within the scribing path. The angle between the first boundary line 41 and the first boundary 51 is d1, and the angle between the second boundary line 42 and the second boundary 52 is d2. The coordinates of B1 is (x1+b, y1+a/2+b tan(d1)), and the coordinates of B2 is (x1+b, y1−a/2−b tan(d2)).

Figure 13:
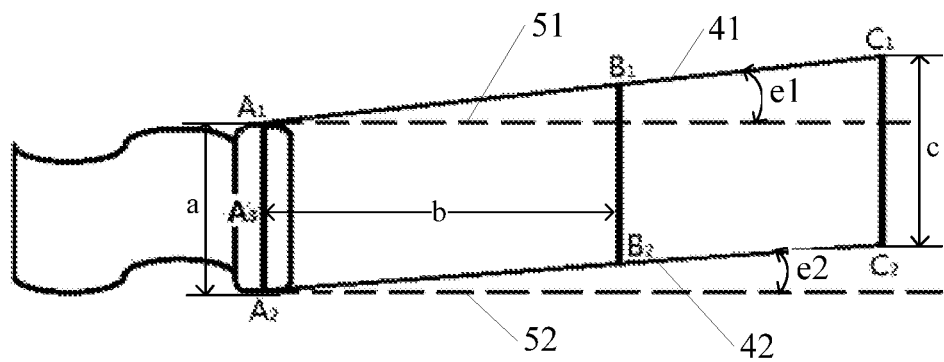
FIG. 13 is a schematic diagram of writing corresponding to method 5 of a smart interactive tablet provided by at least one embodiment of the present disclosure.

Method 5: as illustrated in FIG. 13, the real-time pressure is greater than the pre-display pressure, and the upper side of the real-time pressure is at an outer side of the scribing path, that is, C1 is at an outer side of the scribing path. The angle between the first boundary line 41 and the first boundary 51 is e1, and the angle between the second boundary line 42 and the second boundary 52 is e2. The coordinates of B1 is (x1+b, y1+a/2+b tan(e1)), and the coordinates of B2 is (x1+b, y1−a/2+b tan(e2)).

Figure 14:
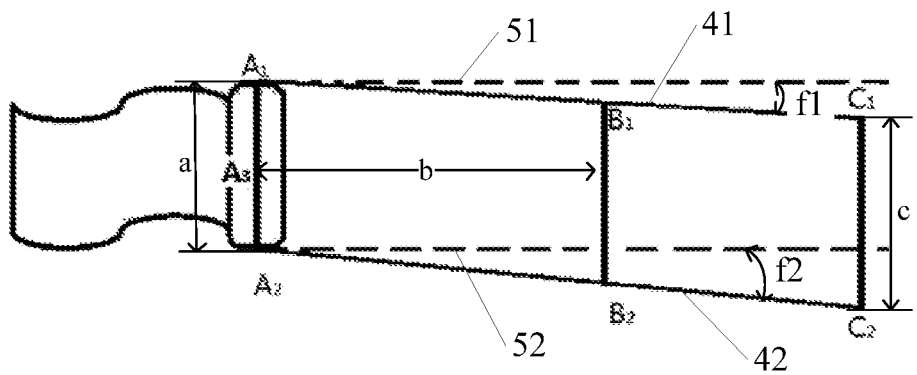
FIG. 14 is a schematic diagram of writing corresponding to method 6 of a smart interactive tablet provided by at least one embodiment of the present disclosure.

Method 6: as illustrated in FIG. 14, the real-time pressure is greater than the pre-display pressure, and the lower side of the real-time pressure is at an outer side of the scribing path, that is, C2 is at an outer side of the scribing path. The angle between the first boundary line 41 and the first boundary 51 is f1, and the angle between the second boundary line 42 and the second boundary 52 is f2. The coordinate of B1 is (x1+b, y1+a/2−b tan(f1)), and the coordinate of B2 is (x1+b, y1−a/2−b tan(f2)).

In a second implementation, the sampling circuit 11 does not need to acquire the pressure sensing information. In this case, the widths of various positions on the writing trajectory displayed on the display panel 6 are the same. For the manner of predicting the scribing trajectory, reference can be made to the related descriptions of the foregoing embodiment in which the starting point and the end point of the scribing trajectory are determined, and details are not repeated herein.

For example, in some embodiments, the smart interactive tablet further includes a writing stylus, the writing stylus is provided with a detector 7 (as illustrated in FIG. 1), and the detector 7 is configured to detect the pressure sensing information of various positions on the writing trajectory and to send the pressure sensing information to the sampling circuit 11. The writing stylus can be used to write on the touch panel 1 and cause the capacitance of the touch panel 1 to change. At the same time, the writing stylus is provided with the detector 7, which can sense the change in pressure during the writing process, that is, the detector 7 is configured to detect the pressure sensing information and to send the acquired pressure sensing information to the sampling circuit 11, and then the sampling circuit 11 sends the pressure sensing information to the second driving circuit 3.

The smart interactive tablet provided by the embodiments of the present disclosure sends the real-time coordinates of the writing trajectory on the touch panel to the second driving circuit by the sampling circuit in the touch panel, and predicts the scribing trajectory between the pre-display coordinates and the real-time coordinates by the second driving circuit and drives the display panel to display the scribing trajectory by the second driving circuit, so that the writing trajectory displayed on the display panel can present a real-time trajectory, thereby avoiding the phenomenon of serious delay during the display of the smart interactive tablet and improving the display effect of the smart interactive tablet.

Figure 15:
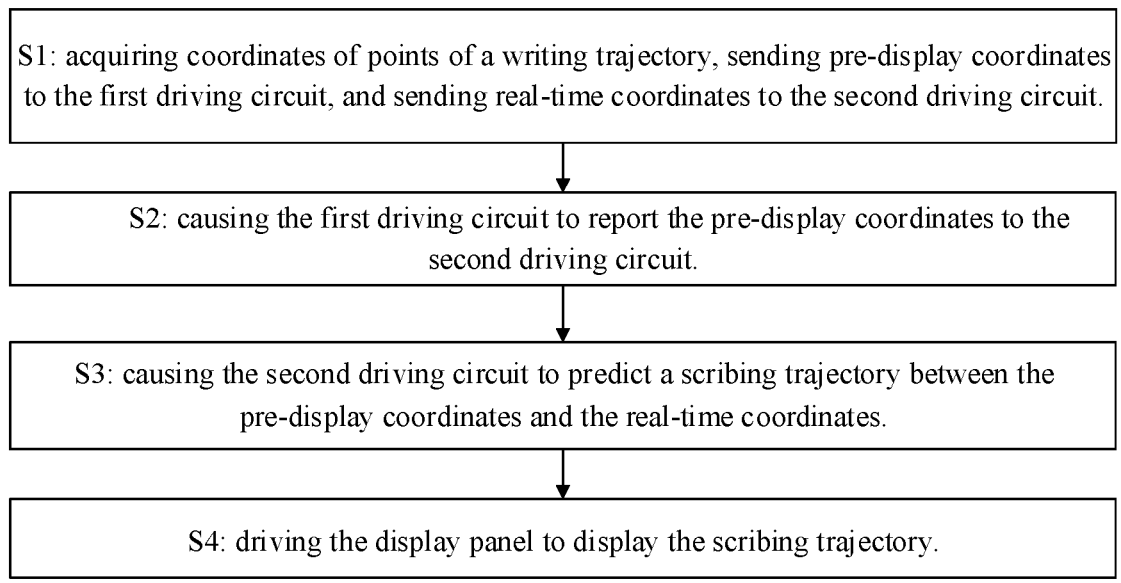
FIG. 15 is a schematic flowchart of a driving method of a smart interactive tablet provided by at least one embodiment of the present disclosure.

As illustrated in FIG. 15, at least one embodiment of the present disclosure further provides a driving method of the smart interactive tablet, and the driving method includes:

S1: acquiring coordinates of points of a writing trajectory, sending pre-display coordinates to the first driving circuit 2, and sending real-time coordinates to the second driving circuit 3, wherein the pre-display coordinates are coordinates corresponding to a certain point of the points of the writing trajectory which is to be displayed by the display panel and different from the end point of the points of the writing trajectory, and the real-time coordinates are coordinates corresponding to the end point of the points of the writing trajectory when the pre-display coordinates are sent.

For example, the sampling circuit 11 provided in the above embodiments can be used to execute step S1 to acquire the coordinates of all positions on the writing trajectory, and then send the pre-display coordinates to the first driving circuit 2 and send the real-time coordinates to the second driving circuit 3. The second driving circuit 3 can determine the end point of the writing trajectory according to the sent pre-display coordinates and real-time coordinates. For example, when the pre-display coordinates are sent to the first driving circuit 2, the stylus tip has moved to another position. At this moment, the position of the stylus tip is the end point of the writing trajectory, and is also the real-time position at the same time, and the corresponding coordinate of the real-time position are the real-time coordinates.

S2: causing the first driving circuit 2 to report the pre-display coordinates to the second driving circuit 3.

In a driving method of the smart interactive tablet in the above hypothetical case, the pre-display coordinates need to be reported to the second driving circuit 3 through the transmission of the first driving circuit 2, and the transmission of the pre-display coordinates by the first driving circuit 2 may be completed in a period of time, which may cause that there is a large distance between the end point of the writing trajectory displayed on the display panel 6 and the end point of the actual writing trajectory, thus causing the phenomenon of display delay. As illustrated in FIG. 3, the end point of the writing trajectory displayed on the display panel 6 is the pre-display coordinates A, while the stylus tip has moved to the real-time coordinates C, there is a large space between position A and position C, so the phenomenon of display delay occurs.

S3: causing the second driving circuit 3 to predict a scribing trajectory between the pre-display coordinates and the real-time coordinates.

For example, step S3 can be implemented by the second driving circuit 3 provided in the above embodiments. In the smart interactive tablet in the foregoing hypothetical case, because the second driving circuit 3 only receives the pre-display coordinates, the end point of the writing trajectory being displayed is the pre-display coordinates. In the present embodiment, the second driving circuit 3 can receive the real-time coordinates in addition to the pre-display coordinates, and perform the prediction of the scribing trajectory between the pre-display coordinates and the real-time coordinates. The real-time coordinates are located behind the pre-display coordinates. Therefore, in the present embodiment, when the writing trajectory is displayed on the display panel 6, the end point of the writing trajectory can be located at the real-time coordinates, that is, coincide with the real-time coordinates; and the end point can also be behind the pre-display coordinates and before the real-time coordinates. Therefore, the space between the end point of the writing trajectory displayed on the display panel 6 and the real-time position of the stylus tip is small, thereby ensuring the display effect of the smart interactive tablet.

S4: driving the display panel 6 to display the scribing trajectory.

For example, step S4 can be completed by the second driving circuit 3 provided in the above embodiments. After the scribing trajectory is determined, the display panel 6 can be driven to display the scribing trajectory.

Figure 16:
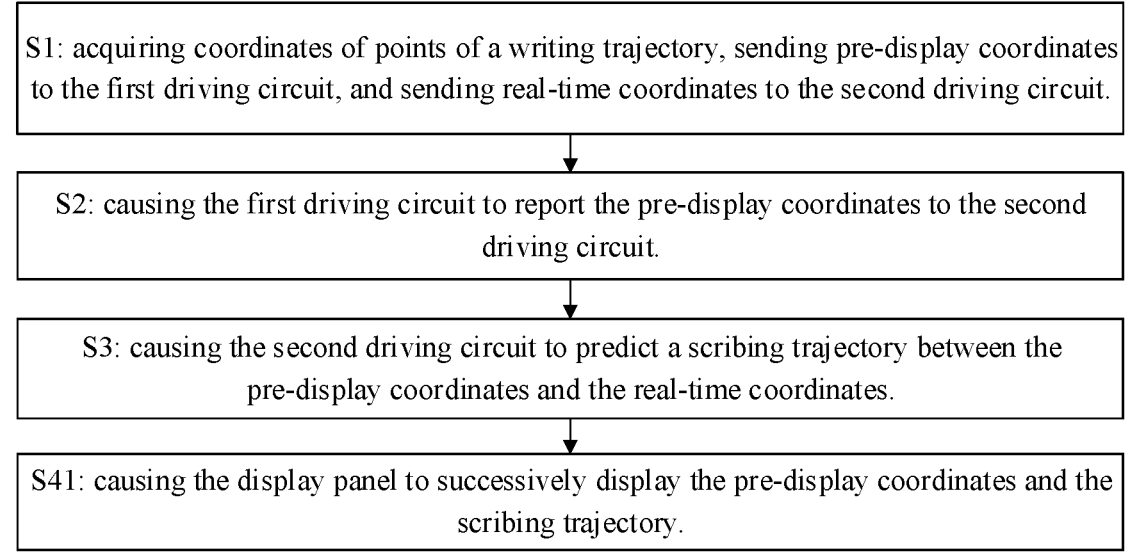
FIG. 16 is another schematic flowchart of a driving method of a smart interactive tablet provided by at least one embodiment of the present disclosure.

For example, in some embodiments, as illustrated in FIG. 16, step S4, that is, the driving the display panel 6 to display the scribing trajectory can include:

S41: causing the display panel 6 to successively display the pre-display coordinates and the scribing trajectory, wherein a starting point of the scribing trajectory includes the pre-display coordinates, an end point of the scribing trajectory includes next-stage display coordinate or includes coordinates which are located between the pre-display coordinates and the next-stage display coordinates, and the next-stage display coordinates are coordinates transmitted by the first driving circuit 2 to the second driving circuit 3 in a writing order after the pre-display coordinates are transmitted by the first driving circuit 2 to the second driving circuit 3.

For example, the second driving circuit 3 can determine the starting point and the end point of the scribing trajectory. As illustrated in FIG. 3, the writing trajectory passes through position A, position B, and position C in sequence, position A includes the pre-display coordinates, and position A is the starting point of the scribing trajectory. After the first driving circuit 2 transmits the coordinates of position A to the second driving circuit 3, the coordinates of position B will be transmitted to the second driving circuit 3 according to the writing order, that is, the coordinates of position B is the next-stage display coordinates. And position C includes the coordinates of the real-time position of the stylus tip corresponding to position A. The second driving circuit 3 can control the end point of the scribing trajectory, so that the end point of the scribing trajectory includes coordinates between the pre-display coordinates of position A and the next-stage display coordinates of position B. Assuming that the end point of the scribing trajectory is position H between position A having the pre-display coordinates and position B having the next-stage display coordinates, the display panel 6 successively displays the pre-display coordinates of position A, the coordinates of the end point H, and the next-stage display coordinates B. When the next-stage display coordinates B is transmitted to the first driving circuit 2, the next-stage display coordinates B become pre-display coordinates at this moment, and the stylus tip has moved to position D. In the driving method of the smart interactive tablet in the above hypothetical case, after the pre-display coordinates is displayed, the next-stage display coordinates are directly displayed. In contrast, the driving method of the smart interactive tablet provided by the present embodiment can display the end point H at a certain time point between displaying the pre-display coordinates and displaying the real-time coordinates, which can reduce the distance between the real-time display position and the real-time position of the stylus tip, thereby achieving the beneficial effect of improving the display effect of the smart interactive tablet.

In addition, in the present embodiment, the end point of the scribing trajectory includes coordinates between the pre-display coordinates and the next-stage display coordinates, and the phenomenon of jumping back of the writing trajectory is not likely to occur. Here, jumping back refers to that: taking four positions of A, H, B and C as an example, the end point of the writing trajectory displayed by the display panel 6 at a first time point is the coordinates of position A, the end point of the writing trajectory displayed at a second time point is the coordinates of position H, and the end point of the writing trajectory displayed at a third time point is the coordinate of position B, and in this case, the scribing trajectory displays these three groups of coordinates in sequence; if the end point H is set between position B and position C, the end point of the writing trajectory displayed by the display panel 6 at the first time point is position A, the end point of the writing trajectory displayed at the second time point is position H which is behind position B, the end point of the writing trajectory displayed at the third time point is position B, and in this case, human eyes may see that the end point of the writing trajectory jumps back. In the present embodiment, the coordinates of the end point of the scribing trajectory is set between the pre-display coordinates of position A and the next-stage display coordinates of position B, which can avoid the phenomenon that the writing trajectory jumps back. For example, in some examples, when determining the end point of the scribing trajectory, assuming that the distance between the pre-display coordinates and the real-time coordinates is L, and the length of the scribing trajectory is L1, the ratio of L1 to L is a preset ratio, and the preset ratio can be specifically 1:4, 1:5, 4:5, etc., which is not specifically limited here as long as the end point of the scribing trajectory can be before the next-stage display coordinates. In addition, because the time interval between adjacent two frames of the smart interactive tablet is very short, the human eyes may not be able to capture the change in the scribing trajectory between the adjacent two frames. Therefore, as illustrated in FIG. 4, the end point H of the scribing trajectory can also be set behind position B; and in this case, the proportion of L1 is large, for example, L1/L can be set to be greater than ½, so that the end point H is located behind position B.

Figure 17:
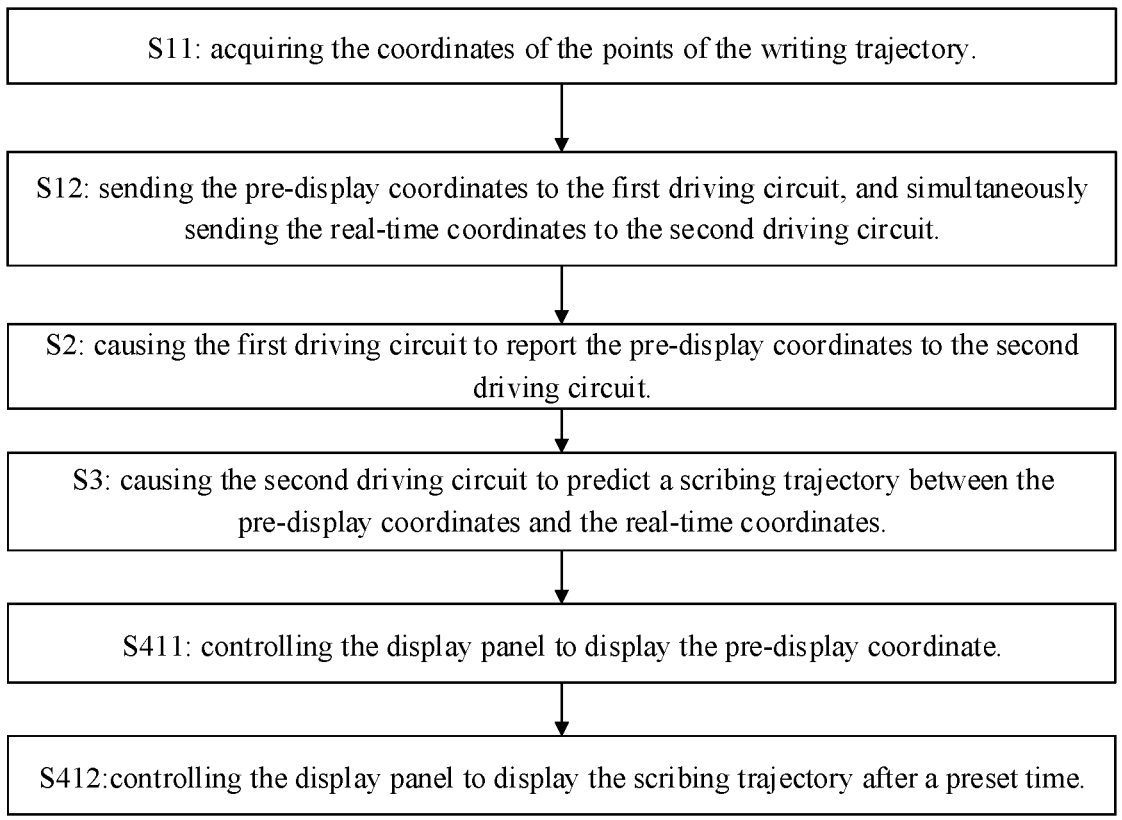
FIG. 17 is further another schematic flowchart of a driving method of a smart interactive tablet provided by at least one embodiment of the present disclosure.

For example, as illustrated in FIG. 17, step S1, that is, the acquiring the coordinates of the points of the writing trajectory, sending the pre-display coordinates to the first driving circuit 2, and sending the real-time coordinates to the second driving circuit 3, can include:

S11: acquiring the coordinates of the points of the writing trajectory;

S12: sending the pre-display coordinates to the first driving circuit, and simultaneously sending the real-time coordinates to the second driving circuit, wherein a time period for transmitting the real-time coordinates is a first time period, and a time period for transmitting the pre-display coordinates is a second time period.

For example, the pre-display coordinates and the real-time coordinates can be sent simultaneously.

As illustrated in FIG. 17, step S41, that is, the causing the display panel 6 to successively display the pre-display coordinates and the scribing trajectory, can include:

S411: controlling the display panel 6 to display the pre-display coordinate;

S412: controlling the display panel 6 to display the scribing trajectory after a preset time period, wherein the preset time period is a time interval between adjacent two frames of the display panel.

For example, the first time period and the second time period are both twice the preset time period. For example, the time elapsed from completing the acquisition of the pre-display coordinates to the second driving circuit 3 completing the reception of the pre-display coordinates is the second time period, the time elapsed from completing the acquisition of the real-time coordinates to the second driving circuit 3 completing the reception of the real-time coordinates is the first time period, and both the first time period and the second time period are twice the preset time period, so that the second driving circuit 3 can be caused to obtain the pre-display coordinates and the real-time coordinates simultaneously. As illustrated in FIG. 5, the second driving circuit 3 control the display panel 6 to display the pre-display coordinates A immediately after receiving the pre-display coordinates A, and the frame being displayed at this moment is defined as a first frame, that is, the pre-display coordinates A are displayed in the first frame; and the second driving circuit 3 control the display panel 6 to display the scribing trajectory after that the second driving circuit 3 receives the real-time coordinate and delays for the preset time period, the frame being displayed at this moment is defined as a second frame, and the end point of the writing trajectory displayed by the display panel 6 in the second frame is H1; during a third frame, the second driving circuit 3 receives the next-stage display coordinates B, then the next-stage display coordinates B can be displayed in the third frame; and the next-stage real-time coordinates H2 corresponding to the next-stage display coordinates can be displayed in a fourth frame. The display panel 6 can be caused to display the pre-display coordinates in odd-numbered frames and to display the scribing trajectory in even-numbered frames.

For example, in some other embodiments, the scribing trajectory and the pre-display coordinates can be displayed at the same time. In this case, the end point of the scribing trajectory can include the real-time coordinates or coordinates of any point between the real-time coordinates and the pre-display coordinates. In the present embodiment, the phenomenon of jumping back during displaying the writing trajectory does not occur. For example, as illustrated in FIG. 6, assuming that the end point of the writing trajectory displayed by the display panel 6 in the first frame is C, because the first driving circuit 2 can transmit coordinate information once every two frames, no new signal is transmitted to the second driving circuit 3 in the second frame; in the second frame, the display panel 6 copies the display information of the first frame, and the end point of the writing trajectory displayed in the second frame is C; during the third frame, a new signal is transmitted to the second driving circuit 3, and the next-stage display coordinates B and the next-stage real-time coordinates D corresponding to the next-stage display coordinates B are transmitted to the second driving circuit 3, therefore, the end point of the writing trajectory displayed in the third frame is D; in the fourth frame, no new signal is transmitted and the end point of the scribing trajectory displayed in the fourth frame is still D. Therefore, the case of that the display panel 6 displays the writing trajectory can be deduced by analogy and will not be repeated here.

Figure 18:
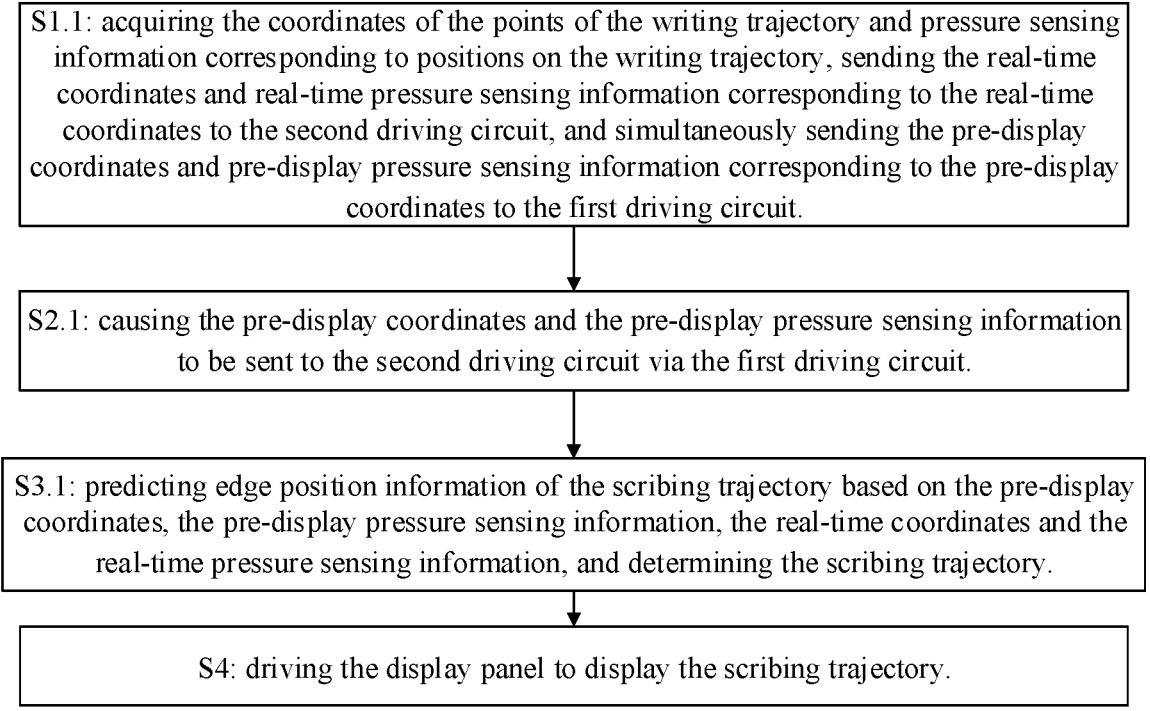
FIG. 18 is still another schematic flowchart of a driving method of a smart interactive tablet provided by at least one embodiment of the present disclosure.

For example, as illustrated in FIG. 18, step S1, that is, the acquiring the coordinates of the points of the writing trajectory, sending the pre-display coordinates to the first driving circuit 2, and sending the real-time coordinates to the second driving circuit 3, can include:

S1.1: acquiring the coordinates of the points of the writing trajectory and pressure sensing information corresponding to positions on the writing trajectory, sending the real-time coordinates and real-time pressure sensing information corresponding to the real-time coordinates to the second driving circuit 3, and simultaneously sending the pre-display coordinates and pre-display pressure sensing information corresponding to the pre-display coordinates to the first driving circuit 2.

Step S2, that is, the causing the first driving circuit 2 to report the pre-display coordinates to the second driving circuit 3 can include:

S2.1: causing the pre-display coordinates and the pre-display pressure sensing information to be sent to the second driving circuit 3 via the first driving circuit 2.

Step S3, that is, the causing the second driving circuit 3 to predict the scribing trajectory between the pre-display coordinates and the real-time coordinates can include:

S3.1: predicting edge position information of the scribing trajectory based on the pre-display coordinates, the pre-display pressure sensing information, the real-time coordinates, and the real-time pressure sensing information, and determining the scribing trajectory.

For example, the pressure sensing information corresponding to the positions on the writing trajectory changes when the user writes on the touch panel 1, and the pressure sensing information can be acquired by the sampling circuit 11. The pressure is related to the width of positions on the writing trajectory being displayed. In the case where the pressure is relatively large, the width of the writing trajectory is large, and in the case where the pressure is relatively small, the width of the writing trajectory is small. FIG. 6 illustrates the writing effect of the touch panel 1 which cannot acquire the pressure sensing information, and FIG. 5 illustrates the display effect of the touch panel 1 which can acquire the pressure sensing information. In the present embodiment, the pressure sensing information can be acquired. For example, as illustrated in FIG. 5, position A has a display width of the pre-display coordinates in the case where the pressure sensing information can be acquired, and position C has a display width of the real-time coordinates in the case where the pressure sensing information can be acquired. The width of position A is a, a represents the width of the writing trajectory at position A, the width of position C is c, and c represents the width of the writing trajectory at position C. In the case where the scribing trajectory between A and C is predicted, the pixel coordinates of the connection line between the upper endpoint of A and the upper endpoint of C can be taken as an upper edge of the scribing trajectory, and the pixel coordinates of the connection line between the lower endpoint of A and the lower endpoint of C can be taken as a lower edge of the scribing trajectory.

Figure 19:
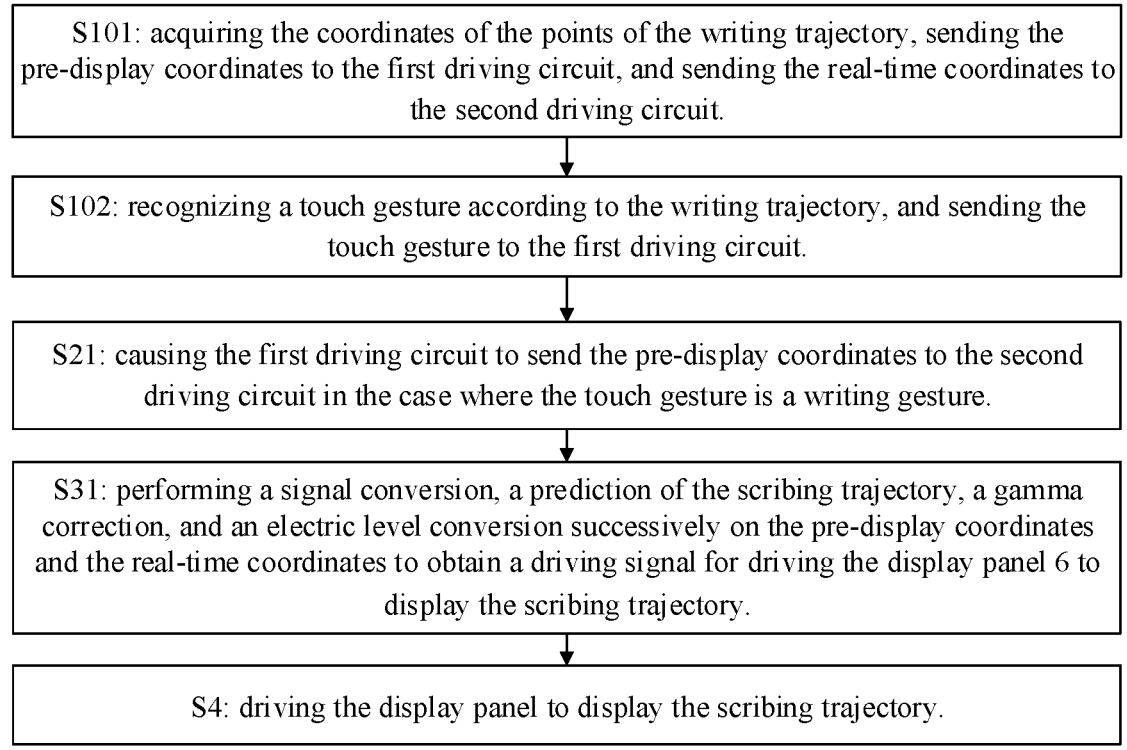
FIG. 19 is still another schematic flowchart of a driving method of a smart interactive tablet provided by at least one embodiment of the present disclosure.

For example, as illustrated in FIG. 19, step S1, that is, the acquiring the coordinates of the points of the writing trajectory, sending the pre-display coordinates to the first driving circuit 2, and sending the real-time coordinates to the second driving circuit 3, can include:

S101: acquiring the coordinates of the points of the writing trajectory, sending the pre-display coordinates to the first driving circuit 2, and sending the real-time coordinates to the second driving circuit 3;

S102: recognizing a touch gesture according to the writing trajectory, and sending the touch gesture to the first driving circuit 2.

Step S2, that is, the causing the first driving circuit 2 to report the pre-display coordinates to the second driving circuit 3 can include:

S21: causing the first driving circuit 2 to send the pre-display coordinates to the second driving circuit 3 in the case where the touch gesture is a writing gesture.

For example, after the writing trajectory is acquired, the stylus tip has moved to the real-time coordinates, that is, point C in FIG. 3, and the gesture recognition sub-circuit 112 can determine the corresponding touch gesture according to the writing trajectory with the point C as the end point. In the case where the user performs writing, the gesture recognition sub-circuit 112 can determine that it is a writing gesture, and in this case, the first driving circuit 2 sends the pre-display coordinates to the second driving circuit 3. Different touch gestures can cause the first driving circuit 2 to call different feedbacks. For example, in the case where the gesture recognition sub-circuit 112 detects that the palm touches the touch panel 1, the first driving circuit 2 may call an eraser in the software program, the pre-display coordinates are not sent to the second driving circuit 3, and the pre-display coordinates are not displayed. The coordinate conversion sub-circuit 113 can calculate the coordinates of the points of the writing trajectory. The pre-display coordinates and the real-time coordinates both corresponding to points on the writing trajectory. For example, after a signal related to a capacitance change on the touch panel 1 is acquired, the analog signal is first converted into a digital signal, and then the digital signal is subjected to a noise processing, and then gesture recognition and coordinate conversion are performed; and the coordinate conversion and touch gesture recognition can be performed simultaneously. In this case, the converting the analog signal into the digital signal can be performed by the analog-to-digital conversion sub-circuit 114 provided in the above embodiments, and the noise processing can be performed by the noise processing sub-circuit 115 provided in the above embodiments.

Step S3, that is, the causing the second driving circuit 3 to predict the scribing trajectory between the pre-display coordinates and the real-time coordinates can include:

S31: performing a signal conversion, a prediction of the scribing trajectory, a gamma correction, and an electric level conversion successively on the pre-display coordinates and the real-time coordinates to obtain a driving signal for driving the display panel 6 to display the scribing trajectory.

The signal conversion can be performed by the signal conversion circuit 31 provided in the above embodiments, the gamma correction can be performed by the gamma correction circuit 33 provided in the above embodiments, the electric level conversion can be performed by the electric level conversion circuit 34 provided in the above embodiments, and the prediction of the scribing trajectory can be performed by the prediction circuit 32 provided in the above embodiments. For example, the real-time coordinates sent by the sampling circuit 11 is converted by the signal conversion circuit 31 to form a signal that matches the second driving circuit 3, and at the same time, the pre-display coordinates sent by the first driving circuit 2 can also be converted first. After the signal conversion is completed, the prediction circuit 32 can perform prediction of the scribing trajectory based on the pre-display coordinates and the real-time coordinates. After the prediction is completed, the display picture of the display panel 6 can be determined. The gamma correction circuit 33 can perform a gamma correction, and then form the driving signal that drives the display panel 6 to display a picture.

For example, in the case where the center of the shape formed by the real-time coordinates is within a scribing path, the scribing trajectory is predicted; otherwise, the scribing trajectory is not predicted. The scribing path includes a first boundary 51 and a second boundary 52, and the first boundary 51 and the second boundary 52 are respectively located at two ends of the shape formed by the real-time coordinates and are both perpendicular to the shape formed by the real-time coordinates. Firstly, it is determined whether the center of the shape formed by the real-time coordinates is within the scribing path; in the case where the center of the shape formed by the real-time coordinates is not within the scribing path, it means that there is a big turning in the writing trajectory, and in this case, the scribing trajectory is not predicted; and in the case where the center of the shape formed by the real-time coordinates is within the scribing path, the scribing trajectory is predicted. Assumes that the pre-display coordinates corresponding to position A, the coordinates of the center point of position A is (x1, y1), the coordinates of the endpoint, coincident with the first boundary 51, of position A is A1, the coordinates of the endpoint, coincident with the second boundary 52, of position A is A2, and the pressure at position A is a, the real-time coordinates corresponding to position C, the coordinates of the center point C3 of position C is (x3, y3), the coordinates of the endpoint, close to the first boundary 51, of position C is C1, the coordinates of the endpoint, close to the second boundary 52, of position C is C2, position B is any position between position A and position C, and the distance between position A and position B is b. The scribing trajectory includes a first boundary line 41 and a second boundary line 42, the first boundary line 41 is a connection line between A1 and C1, and the second boundary line 42 is a connection line between A2 and C2.

As illustrated in FIG. 8, C3 is the center point of the connection line between C1 and C2. In this case, C3 is not within the scribing path, the center of the real-time pressure sensing is not within the scribing path, y3 is greater than y1+a/2, or y3 is smaller than y1−a/2.

Method 1: as illustrated in FIG. 9, the real-time pressure is smaller than the pre-display pressure, and the real-time pressure is all within the scribing path. The angle between the first boundary line 41 and the first boundary 51 is a1, the angle between the second boundary line 42 and the second boundary 52 is a2, and a1 and a2 can both be obtained based on position A and position C, which are not described in detail here. The point, located on the first boundary line 41, of position B is B1, and the point, located on the second boundary line 42, of position B is B2. The coordinates of B1 is (x1+b, y1+a/2−b tan(a1)), and the coordinates of B2 is (x1+b, y1−a/2+b tan(a2)). The coordinates between B1 and B2 are all coordinates on the scribing trajectory.

Method 2: as illustrated in FIG. 10, the real-time pressure is smaller than the pre-display pressure, and a lower side of the real-time pressure is beyond the scribing path, that is, C2 is at an outer side of the scribing path. The angle between the first boundary line 41 and the first boundary 51 is b1, and the angle between the second boundary line 42 and the second boundary 52 is b2. The coordinates of B1 is (x1+b, y1+a/2−b tan(b1)), and the coordinates of B2 is (x1+b, y1−a/2−b tan(b2)).

Method 3: as illustrated in FIG. 11, the real-time pressure is smaller than the pre-display pressure, and an upper side of the real-time pressure is beyond the scribing path, that is, C1 is at an outer side of the scribing path. The angle between the first boundary line 41 and the first boundary 51 is c1, and the angle between the second boundary line 42 and the second boundary 52 is c2. The coordinates of B1 is (x1+b, y1+a/2+b tan(c1)), and the coordinates of B2 is (x1+b, y1−a/2+b tan(c2)).

Method 4: as illustrated in FIG. 12, the real-time pressure is greater than the pre-display pressure, and both ends of the shape formed by the real-time pressure are not within the scribing path. The angle between the first boundary line 41 and the first boundary 51 is d1, and the angle between the second boundary line 42 and the second boundary 52 is d2. The coordinates of B1 is (x1+b, y1+a/2+b tan(d1)), and coordinates of B2 is (x1+b, y1−a/2−b tan(d2)).

Method 5: as illustrated in FIG. 13, the real-time pressure is greater than the pre-display pressure, and the upper side of the real-time pressure is at an outer side of the scribing path, that is, C1 is at an outer side of the scribing path. The angle between the first boundary line 41 and the first boundary 51 is e1, and the angle between the second boundary line 42 and the second boundary 52 is e2. The coordinates of B1 is (x1+b, y1+a/2+b tan(e1)), and the coordinates of B2 is (x1+b, y1−a/2+b tan(e2)).

Method 6: as illustrated in FIG. 14, the real-time pressure is greater than the pre-display pressure, and the lower side of the real-time pressure is at an outer side of the scribing path, that is, C2 is at an outer side of the scribing path. The angle between the first boundary line 41 and the first boundary 51 is f1, and the angle between the second boundary line 42 and the second boundary 52 is f2. The coordinate of B1 is (x1+b, y1+a/2−b tan(f1)), and the coordinate of B2 is (x1+b, y1−a/2−b tan(f2)).

In a second implementation, the sampling circuit 11 does not need to acquire the pressure sensing information. In this case, the widths of various positions on the writing trajectory displayed on the display panel 6 are the same. For the manner of predicting the scribing trajectory, reference can be made to the related descriptions of the foregoing embodiment in which the starting point and the end point of the scribing trajectory are determined, and details are not repeated herein.

The technical effects of the driving method of the smart interactive tablet provided by the embodiments of the present disclosure can be referred to the related description of the smart interactive tablet in the above embodiments, and details are not repeated here.

For the present disclosure, the following statements should be noted.

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A smart interactive tablet, comprising a touch panel, a first driving circuit and a second driving circuit,
   wherein the touch panel is provided with a sampling circuit, the sampling circuit is configured to acquire coordinates of points of a writing trajectory on the touch panel, to send pre-display coordinates to the first driving circuit, and to send real-time coordinates to the second driving circuit,
   the pre-display coordinates are coordinates corresponding to a certain point of the points of the writing trajectory which is to be displayed by the touch panel and different from an end point of the points of the writing trajectory,
   the real-time coordinates are coordinates corresponding to the end point of the points of the writing trajectory when the sampling circuit sends the pre-display coordinates,
   the first driving circuit is configured to report the pre-display coordinates to the second driving circuit, and
   the second driving circuit is configured to predict a scribing trajectory between the pre-display coordinates and the real-time coordinates and to drive the touch panel to display the scribing trajectory.

2. The smart interactive tablet according to claim 1,
   wherein the second driving circuit is configured to control the touch panel to successively display the pre-display coordinates and the scribing trajectory;
   a starting point of the scribing trajectory comprises the pre-display coordinates, and an end point of the scribing trajectory comprises next-stage display coordinates or comprises coordinates which are located between the pre-display coordinates and the next-stage display coordinates, and
   the next-stage display coordinates are coordinates transmitted by the first driving circuit to the second driving circuit in a writing order after the pre-display coordinates are transmitted by the first driving circuit to the second driving circuit.

3. The smart interactive tablet according to claim 2, wherein the sampling circuit is configured to send the real-time coordinates to the second driving circuit while sending the pre-display coordinates to the first driving circuit;

the sampling circuit is further configured to spend a first time period to transmit the real-time coordinates to the second driving circuit, and spend a second time period to transmit the pre-display coordinates to the second driving circuit via the first driving circuit; and the second driving circuit is configured to control the touch panel to display the scribing trajectory after a preset time period after receiving the real-time coordinates, the preset time period is a time interval between adjacent two frames of the touch panel, and the first time period and the second time period are both twice the preset time period.

4. The smart interactive tablet according to claim 1, wherein a starting point of the scribing trajectory comprises the pre-display coordinates, and an end point of the scribing trajectory comprises the real-time coordinates or comprises coordinates which are located between the pre-display coordinates and the real-time coordinates.

5. The smart interactive tablet according to claim 4, wherein the second driving circuit is configured to control the touch panel to simultaneously display the pre-display coordinates and the scribing trajectory.

6. The smart interactive tablet according to claim 1, wherein the sampling circuit is further configured to acquire pressure sensing information corresponding to positions on the writing trajectory, to send the real-time coordinates and real-time pressure sensing information corresponding to the real-time coordinates to the second driving circuit, and to send the pre-display coordinates and pre-display pressure sensing information corresponding to the pre-display coordinates to the first driving circuit;

the first driving circuit is configured to send the pre-display coordinates and the pre-display pressure sensing to the second driving circuit; and the second driving circuit is configured to predict edge position information of the scribing trajectory based on the pre-display coordinates, the pre-display pressure sensing information, the real-time coordinates and the real-time pressure sensing information.

7. The smart interactive tablet according to claim 6, further comprising a writing stylus, wherein the writing stylus is provided with a detector, and the detector is configured to detect the pressure sensing information of the positions on the writing trajectory and to send the pressure sensing information to the sampling circuit.

8. The smart interactive tablet according to claim 1, wherein the sampling circuit comprises a sampling sub-circuit, a gesture recognition sub-circuit, and a coordinate conversion sub-circuit, the sampling sub-circuit is configured to acquire the writing trajectory according to a change in capacitance;

the gesture recognition sub-circuit is configured to determine a touch gesture according to the writing trajectory, and to send the touch gesture to the first driving circuit;

the coordinate conversion sub-circuit is configured to calculate the coordinates of the points of the writing trajectory, to send the pre-display coordinates to the first driving circuit, and to send the real-time coordinates to the second driving circuit; and the first driving circuit is configured to send the pre-display coordinates to the second driving circuit in response to that the touch gesture is a writing gesture.

9. The smart interactive tablet according to claim 1, wherein the second driving circuit comprises a signal conversion circuit, a prediction circuit, a gamma correction circuit, and an electric level conversion circuit; and the signal conversion circuit, the prediction circuit, the gamma correction circuit and the electric level conversion circuit are configured to successively process the pre-display coordinates and the real-time coordinates, and the electric level conversion circuit is configured to generate a driving signal for driving the touch panel to display the scribing trajectory.

10. The smart interactive tablet according to claim 9, wherein the prediction circuit comprises a judgment sub-circuit and a prediction sub-circuit, the judgment sub-circuit is configured to judge whether a center of a shape formed by the real-time coordinates is located within a scribing path, the scribing path comprises a first boundary and a second boundary, and the first boundary and the second boundary are respectively located at two ends of the shape formed by the real-time coordinates and are both perpendicular to the shape formed by the real-time coordinates; and the prediction sub-circuit is configured to predict the scribing trajectory in response to that the center of the shape formed by the real-time coordinates is located within the scribing path.

11. The smart interactive tablet according to claim 1, wherein the touch panel comprises a capacitive touch panel.

12. A driving method, applicable for the smart interactive tablet according to claim 1, comprising:

acquiring coordinates of points of the writing trajectory, sending the pre-display coordinates to the first driving circuit, and sending the real-time coordinates to the second driving circuit, wherein the pre-display coordinates are coordinates corresponding to the certain point of the points of the writing trajectory which is to be displayed by the touch panel and different from the end point of the points of the writing trajectory, and the real-time coordinates are coordinates corresponding to the end point of the points of the writing trajectory when the pre-display coordinates are sent;

causing the first driving circuit to report the pre-display coordinates to the second driving circuit;

causing the second driving circuit to predict a scribing trajectory between the pre-display coordinates and the real-time coordinates; and driving the display panel to display the scribing trajectory.

13. The driving method according to claim 12, wherein the driving the touch panel to display the scribing trajectory comprises:

causing the touch panel to successively display the pre-display coordinates and the scribing trajectory, wherein a starting point of the scribing trajectory comprises the pre-display coordinates, and an end point of the scribing trajectory comprises next-stage display coordinates or comprises coordinates which are located between the pre-display coordinates and the next-stage display coordinates, and the next-stage display coordinates are coordinates transmitted by the first driving circuit to the second driving circuit in a writing order after the pre-display coordinates are transmitted by the first driving circuit to the second driving circuit.

14. The driving method according to claim 13, wherein the acquiring the coordinates of the points of the writing trajectory, sending the pre-display coordinates to the first driving circuit, and sending the real-time coordinates to the second driving circuit, comprises:
acquiring the coordinates of the points of the writing trajectory; and
sending the pre-display coordinates to the first driving circuit, and sending the real-time coordinates to the second driving circuit, wherein a time period for transmitting the real-time coordinates is a first time period, and a time period for transmitting the pre-display coordinates is a second time period; and
the causing the touch panel to successively display the pre-display coordinates and the scribing trajectory comprises:
controlling the touch panel to display the pre-display coordinates, and to display the scribing trajectory after a preset time period, wherein the preset time period is a time interval between adjacent two frames of the touch panel, and the first time period and the second time period are both twice the preset time period.

15. The driving method according to claim 12, wherein a starting point of the scribing trajectory comprises the pre-display coordinates, and an end point of the scribing trajectory comprises the real-time coordinates or comprises coordinates which are located between the pre-display coordinates and the real-time coordinates.

16. The method according to claim 15, wherein the driving the touch panel to display the scribing trajectory comprises:
causing the touch panel to display the pre-display coordinates and the scribing trajectory.

17. The driving method according to claim 12, wherein the acquiring the coordinates of the points of the writing trajectory, sending the pre-display coordinates to the first driving circuit, and sending the real-time coordinates to the second driving circuit comprises:
acquiring the coordinates of the points of the writing trajectory and pressure sensing information corresponding to positions on the writing trajectory, sending the real-time coordinates and real-time pressure sensing information corresponding to the real-time coordinates to the second driving circuit, and simultaneously sending the pre-display coordinates and pre-display pressure sensing information corresponding to the pre-display coordinates to the first driving circuit;
the causing the first driving circuit to report the pre-display coordinates to the second driving circuit comprises:
causing the pre-display coordinates and the pre-display pressure sensing information to be sent to the second driving circuit via the first driving circuit; and
the causing the second driving circuit to predict the scribing trajectory between the pre-display coordinates and the real-time coordinates comprises:
predicting edge position information of the scribing trajectory based on the pre-display coordinates, the pre-display pressure sensing information, the real-time coordinates, and the real-time pressure sensing information, and determining the scribing trajectory.

18. The driving method according to claim 12, wherein the acquiring the coordinates of the points of the writing trajectory, sending the pre-display coordinates to the first driving circuit, and sending the real-time coordinates to the second driving circuit, further comprises:
recognizing a touch gesture according to the writing trajectory, and sending the touch gesture to the first driving circuit; and
the causing the first driving circuit to report the pre-display coordinates to the second driving circuit comprises:
causing the first driving circuit to send the pre-display coordinates to the second driving circuit in a case where the touch gesture is a writing gesture.

19. The driving method according to claim 12, wherein the causing the second driving circuit to predict the scribing trajectory between the pre-display coordinates and the real-time coordinates comprises:
performing a signal conversion, a prediction of the scribing trajectory, a gamma correction, and an electric level conversion successively on the pre-display coordinates and the real-time coordinates to obtain a driving signal for driving the touch panel to display the scribing trajectory.

20. The method according to claim 12, wherein the scribing trajectory is predicted in a case where a center of the shape formed by the real-time coordinates is located within a scribing path; otherwise, the scribing trajectory is not predicted; and
the scribing path comprises a first boundary and a second boundary, and the first boundary and the second boundary are respectively located at two ends of the shape formed by the real-time coordinates and are both perpendicular to the shape formed by the real-time coordinates.

* * * * *